United States Patent
Yang

(10) Patent No.: US 6,534,956 B2
(45) Date of Patent: Mar. 18, 2003

(54) THERMOSTATIC AUTOMATIC CUTOFF CHARGING DEVICE

(76) Inventor: Tai-Her Yang, No. 59, Chung Hsing 8 St., Si-Hu Town, Dzan-Hwa (TW)

(*) Notice: Subject to any disclaimer, the term of this patent is extended or adjusted under 35 U.S.C. 154(b) by 0 days.

(21) Appl. No.: 09/843,803

(22) Filed: Apr. 30, 2001

(65) Prior Publication Data

US 2002/0158607 A1 Oct. 31, 2002

(51) Int. Cl.[7] .................................................. H02J 7/16
(52) U.S. Cl. ...................................................... 320/154
(58) Field of Search ................................ 320/103, 156, 320/154

(56) References Cited

U.S. PATENT DOCUMENTS

| | | | | |
|---|---|---|---|---|
| 5,247,238 A | * | 9/1993 | Yang | 320/154 |
| 5,250,892 A | * | 10/1993 | Yang | 320/154 |
| 6,081,101 A | * | 6/2000 | Yang | 320/154 |
| 6,288,518 B1 | * | 9/2001 | Yang et al. | 320/103 |

* cited by examiner

Primary Examiner—Gregory J. Toatley, Jr.
Assistant Examiner—Pia Tibbits
(74) Attorney, Agent, or Firm—Bacon & Thomas

(57) ABSTRACT

A rechargeable cell is connected in series connection with and thermally coupled to a usually closed thermo-sensitive circuit breaker, so that, once a temperature in the cell that is being charged to saturation rises to a predetermined level, the heat thereby produced will cut off the usually closed thermo-sensitive circuit breaker, a heat generating resistor that is in parallel with and thermally coupled to the usually closed contacts on the usually closed circuit breaker will produce, as current passes through it, a heating effect serving to open the usually closed thermo-sensitive circuit breaker, the same heat generating resistor in the meantime restricting a topping current that is released from the rechargeable cell, thereby holding usually closed circuit breaker open for an extended period as said battery cools following opening of said usually closed circuit breaker.

26 Claims, 12 Drawing Sheets

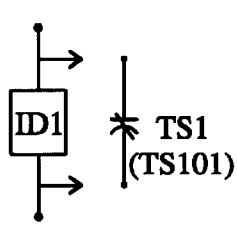
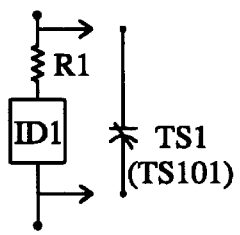
FIG. 26  FIG. 27
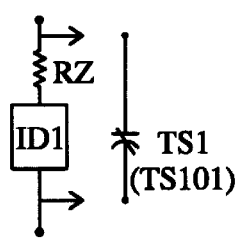
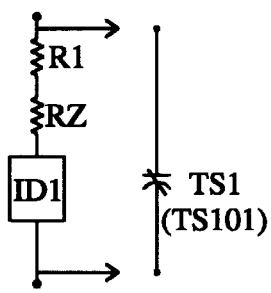
FIG. 28  FIG. 29
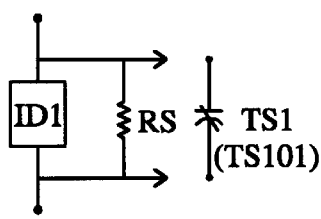
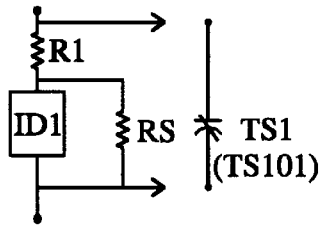
FIG. 30  FIG. 31
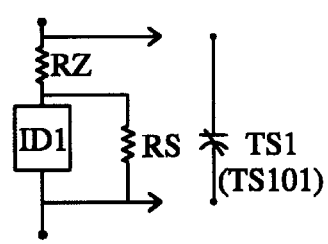
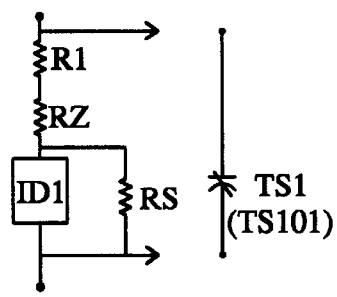
FIG. 32  FIG. 33

THERMOSTATIC AUTOMATIC CUTOFF CHARGING DEVICE

BACKGROUND OF THE INVENTION (a) Field of the Invention

The present invention relates to an automatic cutoff battery charging device in which at least one rechargeable cell and a usually closed thermo-sensitive circuit breaker are connected in series and thermally coupled such that, once the usually closed thermo-sensitive circuit breaker is broken due to thermal intervention as the temperature of the cell reaches its saturation rises to a predetermined level, a parallel connection will be formed through a heat generating resistor and the contacts on the usually closed thermo-sensitive circuit breaker. The heat generating resistor, which is also thermally coupled to the rechargeable cell, produces heat as a current passes through it, thereby preventing the usually closed thermo-sensitive circuit breaker from resetting. Meanwhile, the heat generating resistor also serves to limit the charging current that is being maintained in the rechargeable cell, the heat generating resistor being prevented from conduction of current in the circuit by switching the charging power supply off or by removing the rechargeable cell, after which the usually closed thermal circuit breaker may be permitted to cool to its normal operating state.

(b) Description of the Prior Art

At a time when portable electric appliances of one kind or another are constantly being carried around for day-to-day use, everywhere and on every occasion, by people of all walks in life, rechargeable cells have become indispensable as a mobile source of power supply. To prevent overcharging, it is necessary to provide automatic cutoff charging devices. However, the automatic charging cutoff devices known in the art, are typically complex devices made of a multitude of electronic parts that serve to cut off the power once the rechargeable cell reaches saturation, as well as to provide a follow-up topping charge, that is, a form of continual, sustaining charge. This results in a rather higher cost outlay.

SUMMARY OF THE INVENTION

This invention replaces the complex and costly automatic cutoff circuitry of prior devices with a simple design made up of a usually closed thermo-sensitive circuit breaker and a parallel connected heat generating resistor that provides a topping charge to the rechargeable battery after cut-off of the circuit breaker.

In particular, the invention provides a design in which at least one rechargeable cell and the usually closed thermo-sensitive circuit breaker are connected in series and thermally coupled such that, once the usually closed thermo-sensitive circuit breaker is broken due to thermal intervention as the temperature of the cell reaches its saturation rises to a predetermined level, a parallel connection will be formed through a heat generating resistor and the contacts on the usually closed thermo-sensitive circuit breaker. The heat generating resistor, which is also thermally coupled to the rechargeable cell, produces heat as a current passes through it, thereby preventing the usually closed thermo-sensitive circuit breaker from resetting. Meanwhile, the heat generating resistor also serves to limit the charging current that is being maintained in the rechargeable cell, the heat generating resistor being prevented from conduction of current in the circuit by switching the charging power supply off or by removing the rechargeable cell, after which the usually closed thermal circuit breaker may be permitted to cool to its normal operating state.

BRIEF DESCRIPTION OF THE DRAWINGS

FIG. 26 is a diagram of a circuit in which a display means is directly connected in parallel with the usually closed thermo-sensitive circuit breaker;

FIG. 27 is a diagram of a circuit in which the display means is connected in series with the heat generating resistor before being parallelled with the usually closed thermo-sensitive circuit breaker;

FIG. 28 is a diagram of a circuit in which the display means is connected in series with a voltage downgrading resistor before being parallelled with the usually closed thermo-sensitive circuit breaker;

FIG. 29 is a diagram of a circuit in which the display means of the invention is connected in series with both a voltage downgrading resistor and a heat generating resistor before being paralleled with a usually closed thermo-sensitive circuit breaker;

FIG. 30 is a diagram of a circuit in which the display means is connected in parallel with a current divisor resistor before being parallelled with the usually closed thermo-sensitive circuit breaker;

FIG. 31 is a diagram of a circuit in which the display means is connected in parallel with the current divisor resistor and the heat generating resistor is connected in parallel with the usually closed circuit breaker;

FIG. 32 is a diagram of a circuit in which the display means is connected in parallel with the current divisor resistor before being connected in series with a voltage downgrading resistor, followed by paralleling with the usually closed thermo-sensitive circuit breaker;

FIG. 33 is a diagram of a circuit in which the display means is connected in parallel with a current divisor resistor and serially connected with a voltage downgrading resistor and a heat generating resistor before paralleling with a usually closed thermo-sensitive circuit breaker;

DETAILED DESCRIPTION OF THE PREFERRED EMBODIMENTS

Figure 2:
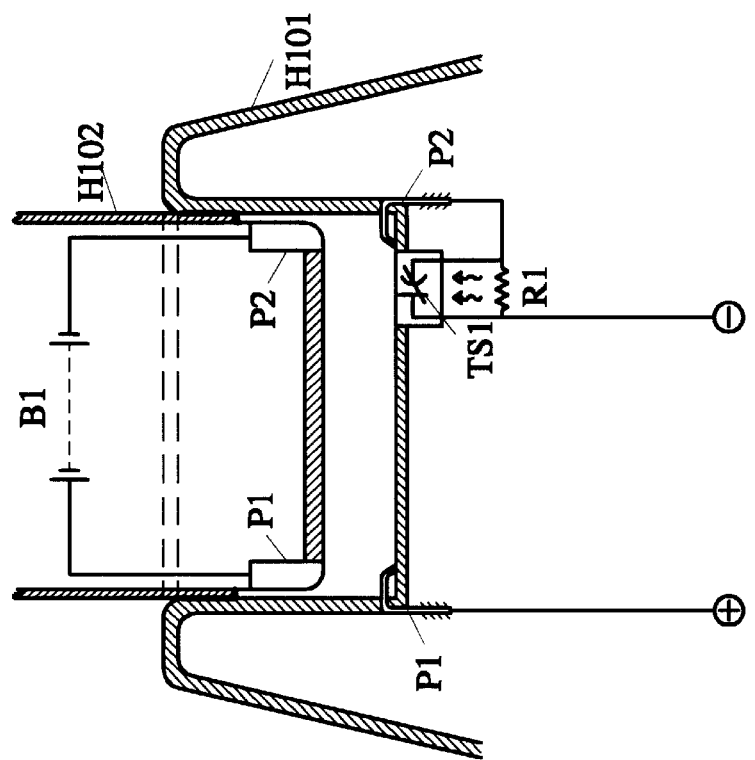
FIG. 2 is a schematic diagram of a second preferred embodiment of the invention, in which the usually closed heat sensitive circuit breaker device and heat generating resistor are situated beside the rechargeable cell.
Figure 1:
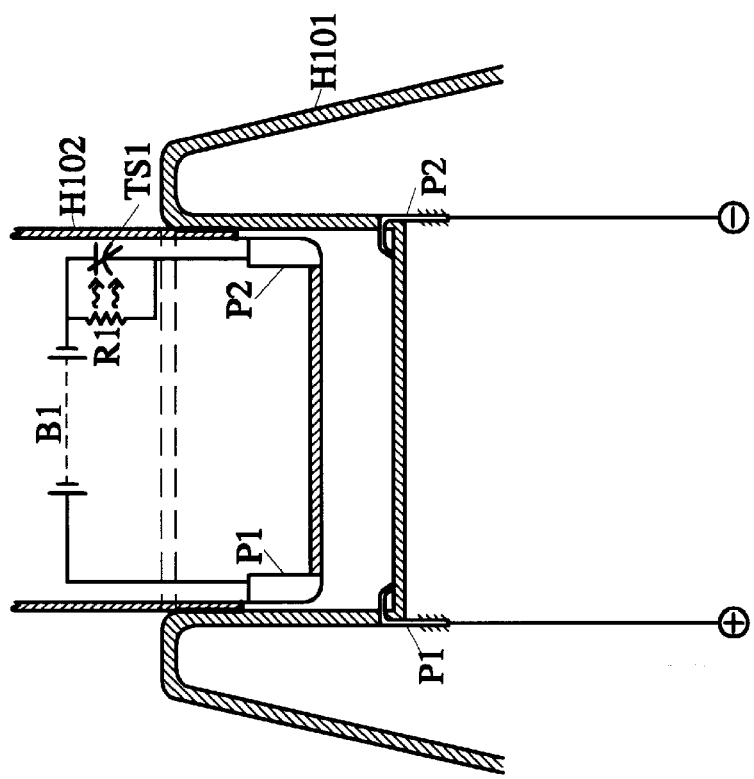
FIG. 1 is a schematic diagram of a first preferred embodiment of the invention, in which the usually closed heat sensitive circuit breaker device and heat generating resistor are included within the rechargeable cell.
Figure 4:
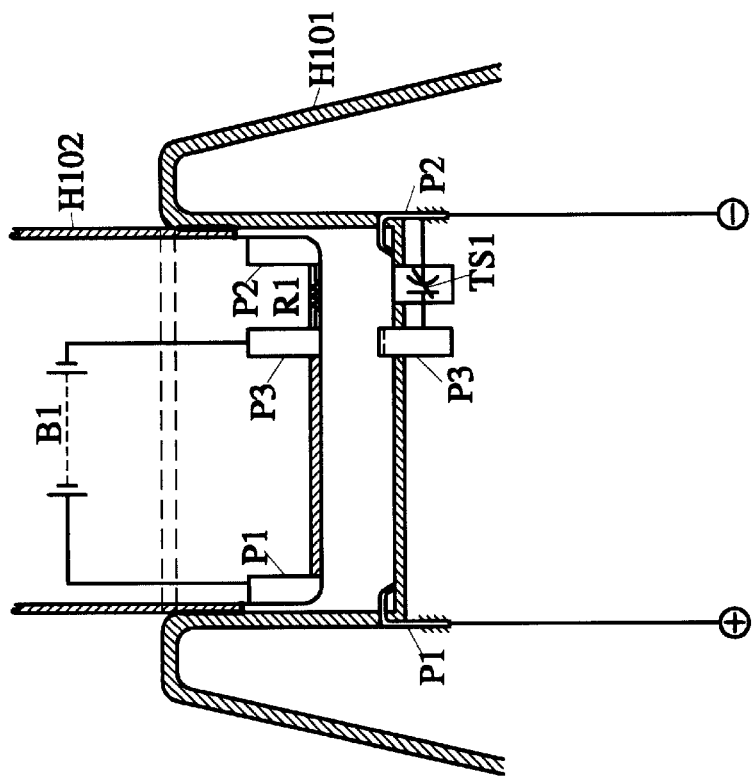
FIG. 4 is a schematic diagram of a fourth preferred embodiment of the invention, in which the heat generating resistor is situated beside the rechargeable cell and the usually closed heat sensitive circuit breaker is situated beside a charging power supply.
Figure 3:
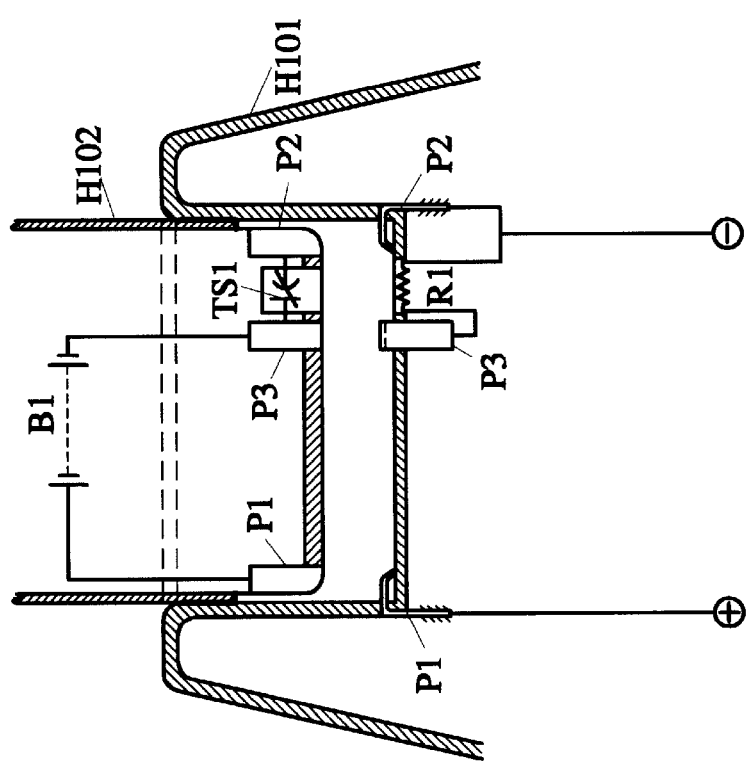
FIG. 3 is a schematic diagram of a third preferred embodiment of the invention, in which the usually closed heat sensitive circuit breaker device is situated beside the rechargeable cell and the heat generating resistor is situated beside a charging power supply.
Figure 5:
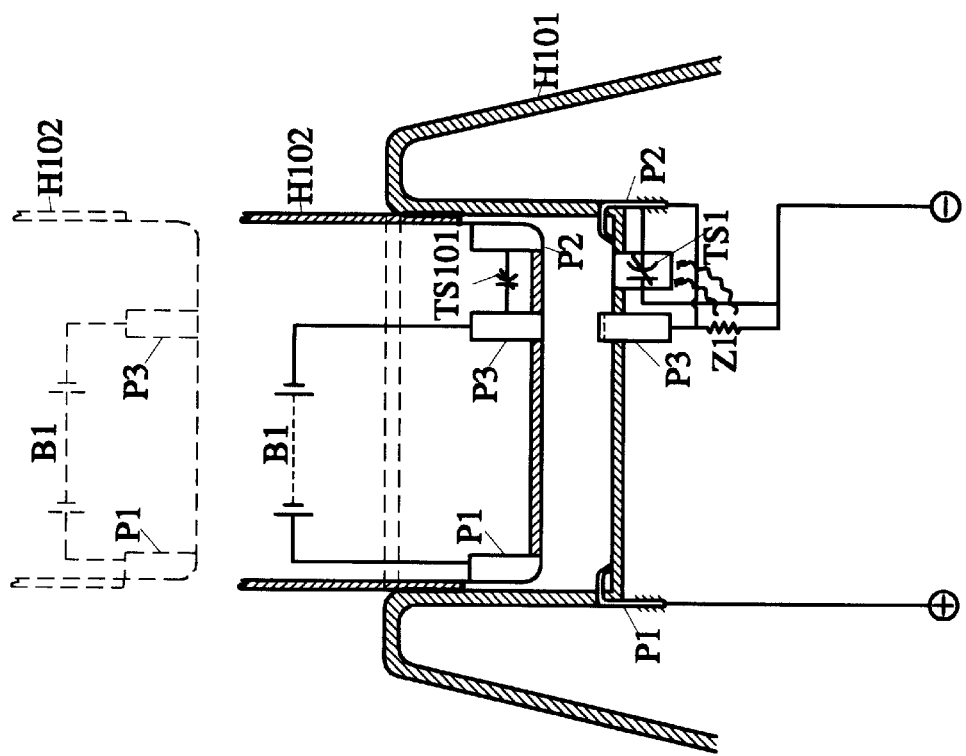
FIG. 5 is a schematic diagram of a fifth preferred embodiment of the invention, in which the usually closed heat sensitive circuit breaker and heat generating resistor are applied to two rechargeable cells.

Structurally, the thermostatic automatic cutoff charging device according to the invention includes:

1. a structural body on the charging power side of the charging device which consists of one or more fixed resistance, variable resistance, Positive Temperature Coefficient (PTC), or Negative Temperature Coefficient (NTC) resistors, or two or more differently characterized resistors in series or parallel connection or in compound serial/parallel connection, that collectively make up a heat generating resistor R1; and a usually closed thermo-sensitive circuit breaker TS1, the heat generating resistor R1 and the usually closed thermo-sensitive circuit breaker TS1 being connected in parallel and forming a thermocouple (such as is indicated by the arrow shown in FIG. 1), the parallel-connected heat generating resistor R1 and circuit breaker TS1 being connected in series with a rechargeable cell and situated in a compartment of the rechargeable cell shell casing H102, the compartment being coupled directly or by way of a conductive contact or socket/plug assembly to the charging power supply side H101 of the charger and associated circuits, in a mounted or other configuration, as illustrated in FIG. 1;

2. One or more fixed resistance, variable resistance, Positive Temperature Coefficient (PTC), or Negative Temperature Coefficient (NTC) resistors, or two or more differently characterized resistors, in series, parallel, or compound serial/parallel combination, that collectively make up a heat generating resistor R1 and that are connected in parallel with a usually closed thermo-sensitive circuit breaker TS1 to form a thermocouple (is shown by the arrow head in FIG. 2) connected in series with a D.C. power supply in proximity to relevant circuits within structure H101 on the charging power supply side, and directly or by way of conductive contacts or plug/socket assembly coupling interconnected to a rechargeable cell and housing H102, as shown in FIG. 2;

3. One or more fixed or variable resistors, Positive Temperature Coefficient (PTC), Negative Temperature Coefficient (NTC) resistors, or two or more differently characterized resistors in series, parallel, or compound serial/parallel combination, which collectively make up a heat generating resistor R1, and which together with a usually closed thermo-sensitive circuit breaker TS1 form a thermocouple connected in parallel by means of conductive contacts or a plug/socket assembly, the thermo-sensitive circuit breaker TS1 being further connected in series with a rechargeable cell for collocation in the housing H102 beside the rechargeable cell, said resistor R1 being situated beside the charging power supply in a mounted or otherwise configured structure H101 integral therewith or in combination with relevant circuits, as shown in FIG. 3;

4. One or more fixed or variable resistors, Positive Temperature Coefficient (PTC) or Negative Temperature Coefficient (NTC) resistors, or two or more differently characterized resistors in series, parallel, or compound serial/parallel combination to form a heat generating resistor R1, which together with a usually closed thermo-sensitive circuit breaker TS1 forms a thermocouple and which is connected by means of conductive contacts or plug/socket assembly in series with the rechargeable cell to form a structure beside the rechargeable cell housing H102, the usually closed thermo-sensitive circuit breaker TS1 being connected in series with the charging power supply, collocated with other relevant circuits, beside the housing H101, and made integral therewith, the heat generating resistor R1, the rechargeable cell, and the housing H102 together forming a structure beside the rechargeable cell as shown in FIG. 4;

5. Heat generating resistor R1 made up of one or more fixed or variable resistors, Positive Temperature Coefficient (PTC) or Negative Temperature Coefficient (NTC) resistors, or two or more differently characterized resistors in series or parallel connection, or in compound serial/parallel combination, heat generating resistor R1 being thermally coupled with usually closed thermo-sensitive circuit breaker TS1 and interconnected together at one end, by means of conductive contacts or a plug/socket assembly with one side of the D.C. charging power supply, as shown by the arrow head in FIG. 5, the other end of a usually closed contact being connected to a conductive contact or plug/socket assembly P2, the other end of the heat generating resistor R1 being connected to conductive contact or plug/socket assembly P3, and the other end of the D.C. power supply being connected to the conductive contact or plug/socket assembly P1, the aforementioned circuits being collocated integrally within a structural compartment beside the charging power supply housing H101, and by direct coupling or through conductive contacts or via plug/socket assembly coupling to the rechargeable cell and to the housing H102 beside the charging power supply forming a structural entity beside the rechargeable cell, the structural entity beside the rechargeable cell incorporating conductive contact or plug/socket assemblies P1 and P3 to facilitate feeding and outputting of electric power in place of the usually closed thermo-sensitive circuit breaker TS101, or alternatively conductive contacts or plug/socket assembly P1 and P3 serving the purpose of inputting/outputting electric energy provided, in which case the usually closed thermosensitive circuit breaker TS101 may be connected in series with the conductive contacts or plug/socket assembly P3 on the part of rechargeable cell B1, while the other end of the usually closed thermo sensitive circuit breaker TS101 is connected to the conductive contact or plug/socket assembly P2 to provide a dual purpose structure, as illustrated in FIG. 5.

Figure 6:
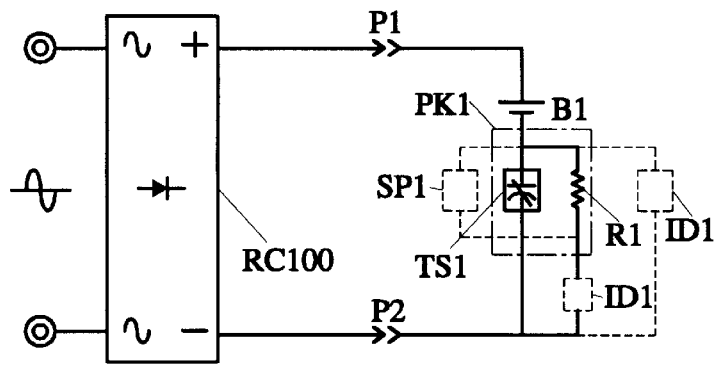
FIG. 6 is a circuit diagram illustrating operation of the embodiment in which the usually closed thermo-sensitive circuit breaker and heat generating resistor are situated beside a rechargeable cell.

FIGS. 1 through FIG. 5 illustrate altogether the basic structure of the thermostatic automatic cutoff charging device of the invention. This structure allows for a variety of alternate matching circuits of which a few examples will be dealt with next to demonstrate rather than to limit the scope of application that is possible with any embodiment executed according to the above-described basic structure. Referring to FIG. 6, which illustrates one example of the invention the preferred usually closed thermo-sensitive circuit breaker with heat generating resistor as executed beside the rechargeable cell, it is seen that this embodiment includes the following structures:

A heat generating resistor R1 which consists of one or more fixed or variable resistors, Positive Temperature Coefficient (PTC) or Negative Temperature Coefficient (NTC) resistors, or two or more differently characterized resistors in serial, parallel, or compound serial/parallel combination, and which is connected in parallel with the usually closed thermo-sensitive circuit breaker TS1, the heat generating resistor and thermo-sensitive circuit breaker cooperating to form an enclosure PK1, or alternatively the resistor and circuit breaker being situated adjacent to each other and housed in a totally sealed or half sealed chamber to form a thermocouple, the resistor and circuit breaker also being connected to the rechargeable cell B1 in the housing H102 and to the charging power supply together with a charging power supply circuit situated within a charging power side housing H101 by means of conductive contacts or a plug/socket assembly, the coupling being made active when the charging is taking place, and the heat generating resistor R1 being connected in parallel across and thermo-coupled to the ends of the usually closed thermo-sensitive circuit breaker TS1 in order to be in series with the rechargeable cell B1 when coupled with conductive charging contacts or plug/socket assembly P1, P2, or when in direct contact with the D.C. power supply, wherein when the resulting battery and resistor/circuit breaker unit is coupled to the conductive contacts or plug/socket assembly P1, P2 or directly to the D.C. power supply and the rechargeable cell B1 is charged to saturation concurrent with release of heat so that the usually closed thermo-sensitive circuit breaker TS1 becomes open, the heat generating resistor R1 will produce heat because of a topping current present in the rechargeable cell, whereby the usually closed circuit breaker TS1, by the action of the heat thus generated, is maintained open, the impedance on the part of the heat generating resistor R1 sufficing to limit the topping current to a level appropriate for the rechargeable cell B1, a display ID1 being optionally installed in parallel across both ends of the usually closed thermo-sensitive circuit breaker TS1 to convert electric energy into audio signals or optic signals by the incorporation of a voltage restriction or current divisor for that purpose, the above-mentioned display and associated voltage restriction or current divisor being included as an option to the subject thermostatic automatic cutoff charging device that may be in addition to or supplemented with a conventional conductive contact protector SP1 so as to inhibit electromagnetic interference and to protect the conductive contacts in the presence of currents prevailing once the conductive contacts on the usually closed thermo-sensitive circuit breaker are cut off);

A charging power supply in the form of a common D.C. power supply or a D.C. power supply achieved by rectification of an A.C. source; and A rectifier RC100 in which a single phase, multiple phase, or center tapped A.C. power source is rectified to be a full-wave or half-wave D.C. output; essentially a diode or bridge rectifier.

Figure 7:
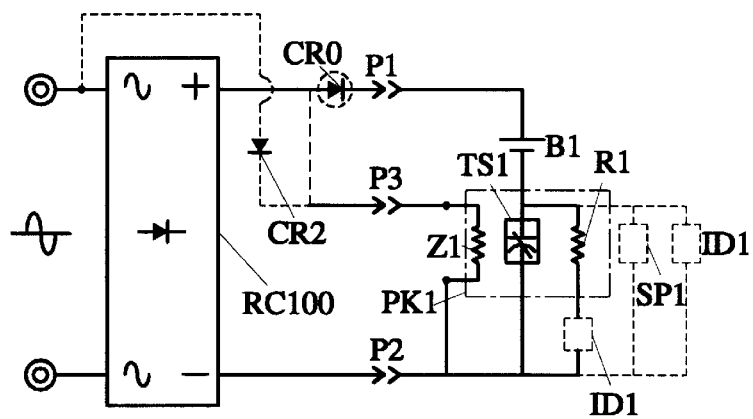
FIG. 7 is a diagram of a modification of the circuit shown in FIG. 6, illustrating incorporation of an auxiliary resistor element circuit.

An embodiment of the invention characterized by the addition of an auxiliary resistor to the circuit illustrated in FIG. 6 is shown in FIG. 7. Auxiliary resistor Z1 may include one or more fixed or variable resistors, Positive Temperature Coefficient (PTC) or Negative Temperature Coefficient (NTC) resistors, or alternatively two or more differently characterized resistors in series, parallel, or in a compound serial/parallel combination, and is connected in parallel across the charging power supply The auxiliary resistor cooperates to form a module, unit, or enclosure PK1 together with heat generating resistor R1 and usually closed thermo-sensitive circuit breaker TS1, or alternatively is adjacently collocated with the heat generating resistor R1 and circuit breaker TS1 in a fully sealed or half sealed enclosure to provide for thermo-coupling. Supplemental heat is produced during charging at low temperature in order to compensate for the effects of low temperature environments on operation points of the usually closed thermo-sensitive circuit breaker TS1. The rechargeable cell B1 and the charging power supply are coupled by means of triplicate interfacing conductive contacts or plug/socket assemblies P1, P2 and P3, whereupon one end of the auxiliary resistor Z1 will be connected to the negative polarity of the rechargeable cell B1, or alternatively to the positive polarity thereof (or to the negative polarity of the rechargeable cell B1 which is already in series with a usually closed thermo-sensitive circuit breaker), while the other end of auxiliary resistor Z1 is connected by means of conductive contacts or plug/socket assembly P3 to the other end of the opposite polarity terminal on the charging power supply side, so as to offer temperature compensation in different temperature environments In addition, to prevent the rechargeable cell B1 from discharging in the reverse direction by way of auxiliary resistor Z1, isolation may be provided by selectively installed insulation diode CR2 to meet circuit conditions, in either manner prescribed below:

1. the diode CR2 may be provided in a forward series connection between the power supply side of the auxiliary resistor Z1 and the side of the A.C. power supply and rectifier RC100 from which the output is D.C., in order for the auxiliary resistor Z1 to acquire the D.C. power supply as needed and serve at the same time to prevent reverse discharge of the rechargeable cell B1; or
2. the diode CR0 may be provided in a forward series connection between the power supply end of the auxiliary resistor Z1 in common with the D.C. output terminal of the rectifier RC100 to which the input is the charging power supply, and eventually to the charging power side of the conductive contact or plug/socket assembly P1, thereby serving to prevent reverse discharge from the rechargeable cell B1.

Figure 8:
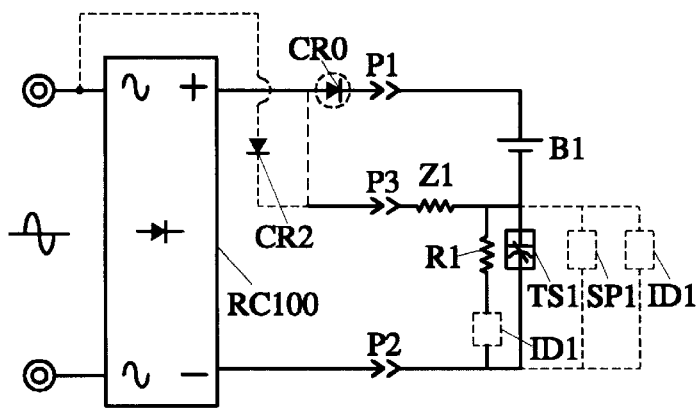
FIG. 8 is a diagram of a modification of the circuit shown in FIG. 7, in which the auxiliary resistor element and heat generating resistor are connected in series with each other.
Figure 9:
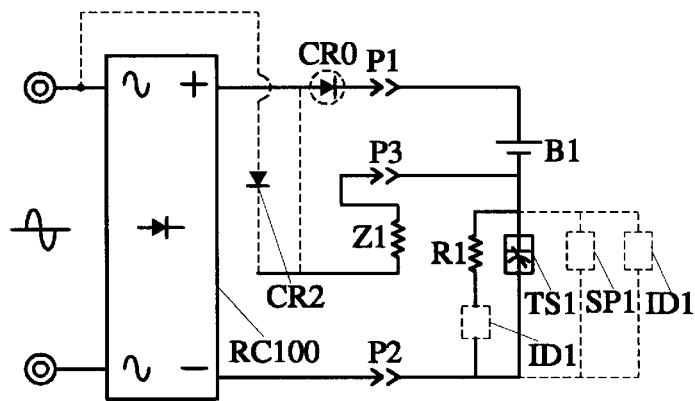
FIG. 9 is a diagram of a further modification of the circuit shown in FIG. 7, in which the auxiliary resistor element is situated beside the power supply and connected to the positive polarity of the power supply and the load terminal of the rechargeable cell.
Figure 10:
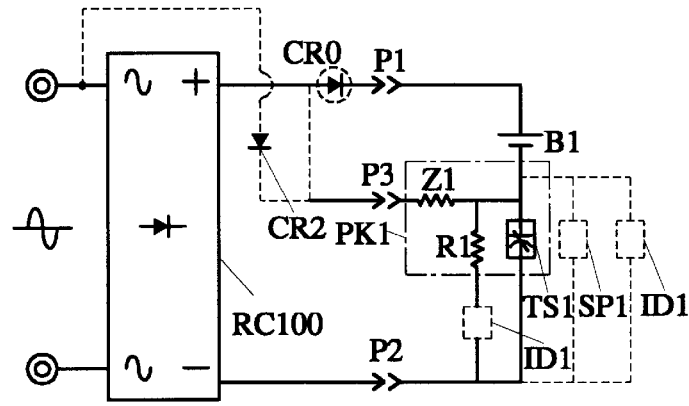
FIG. 10 is a diagram of a further modification of the circuit shown in FIG. 7, in which the auxiliary resistor element, the heat generating resistor and the usually closed thermo-sensitive circuit breaker are all situated beside the rechargeable cell.

Apart from being connected directly to or in parallel with the charging power supply across conductive contacts or plug/socket assemblies, as shown schematically in FIG. 7, the auxiliary resistor Z1 can be connected in series with the heat generating resistor R1 as illustrated in FIG. 8, before being parallel connected with the D.C. power supply. FIG. 8 schematically shows an example in which an auxiliary resistor is connected in series with the heat generating resistor as an addition incorporated to the circuitry shown in FIG. 7. The auxiliary resistor Z1 may be mounted as required on the load side or on the charging power supply side. FIG. 9 shows an example in which the auxiliary resistor that is added to the circuit shown in FIG. 7 is mounted on the side of the charging power supply, in parallel across the positive polarity terminal of the charging power supply, although the auxiliary resistor may just as well be associated with the negative polarity terminal of the rechargeable cell. Also, to yield better thermocouple effects, as a preferred alternative to the above-mentioned instances whereby the heat generating resistor R1 cooperates with the usually closed thermo-sensitive circuit breaker TS1 in a common enclosure PK1, or alternatively in a fully sealed or half-sealed enclosure, it is feasible to cooperatively mount the auxiliary resistor Z1, the heat generating resistor R1 and the usually closed circuit breaker TS1 adjacent the rechargeable cell in a common enclosure PK1, or alternatively in a tightly sealed or partially sealed chamber. Finally, FIG. 10 shows an example in which the auxiliary resistor, the heat generating resistor, and the usually closed thermo-sensitive circuit breaker are cooperatively installed on the side of the rechargeable cell.

The examples illustrated in FIG. 6 through FIG. 10 are similar in that the usually closed thermo-sensitive circuit breaker is installed onto the rechargeable cell. Where structurally justifiable, however, it is also possible for the usually closed thermo-sensitive circuit breaker to be mounted on the charging power supply side and the thermocouple upon loading of the rechargeable cell in the charging device.

Figure 11:
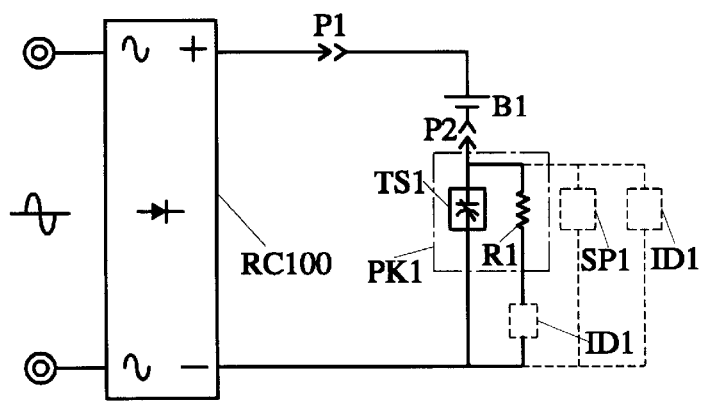
FIG. 11 is a diagram of a circuit in which the usually closed thermo-sensitive circuit breaker and heat generating resistor are situated beside the charging power supply.

FIG. 11 illustrates an embodiment in which the usually closed thermo-sensitive circuit breaker with heat generating resistor is mounted to the charging power supply side, the embodiment including the following structures:

Heat generating resistor R1 in the form of one or more fixed or variable resistors, Positive Temperature Coefficient (PTC) or Negative Temperature Coefficient (NTC) resistors, or two or more differently characterized resistors connected in series or parallel or in a compound serial/parallel combination, resistor R1 being further connected in parallel with the usually closed circuit breaker TS1 to form a unit, module, or enclosure PK1, or alternatively parallel connected and situated adjacent the circuit breaker TS1 in a fully sealed or partially sealed chamber, in such a manner that the resistor and circuit breaker are thermo-coupled to each other, the resistor and circuit breaker being further collocated with the charging power supply circuit in the charging power supply side housing H101 to make up a charging power supply side structure integral with the rechargeable cell side structure consisting of the rechargeable cell B1 and the housing H102 and to be mutually thermo-coupled with the rechargeable cell when the cell is in a state of charging operation the relative locations of the various components and housings being of course variable depending on the specific application, the heat generating resistor R1 being connected in parallel with and thermo-coupled to the usually closed contacts on the usually closed thermo-sensitive circuit breaker TS1 before being connected in series with the charging power supply so as to conduct when the rechargeable cell B1 is loaded by way of conductive contacts or plug/socket assembly and the rechargeable cell B1 is charged to saturation with the resulting production of heat, the thermocouple eventually causing the usually closed circuit breaker TS1 to open and a topping current released from the rechargeable cell B1 through the heat generating resistor R1, the impedance of heat generating resistor R1 serving to limit the topping current that is being maintained in the rechargeable cell B1, and a display ID1 being optionally connected in parallel across both ends of the usually closed thermo-sensitive circuit breaker TS1, by means of which electric energy is converted into audio or video signals with the assistance of appropriate voltage restriction or current division means, the display together with relevant voltage restriction or current division means integral with the thermostatic automatic cutoff charging device serving to advise of completion of a charging operation and may optionally incorporate a prior art contact protection means SP1 to inhibit electromagnetic interference and protect conductive contacts unaffected by currents prevailing once the conductive contacts at the usually closed thermo-sensitive circuit breaker are broken;

A charging power supply, supplied as a common D.C. power source or a D.C. power source derived from a rectified A.C. source; and A rectifier RC100 in the form of a diode or bridge rectifier in which single phase or multiple phase A.C. source or center tapped A.C. source is rectified into a full-wave or half-wave D.C. power supply.

Figure 12:
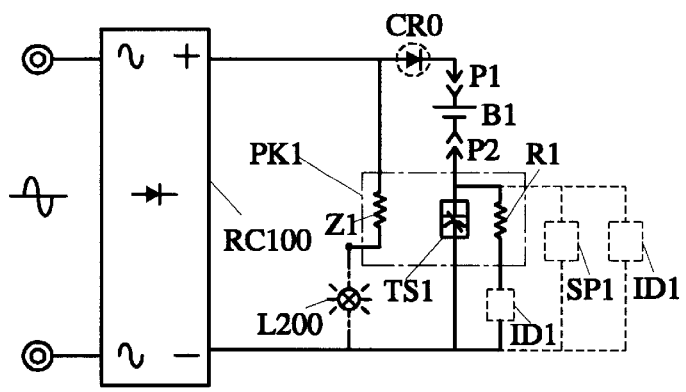
FIG. 12 is a diagram of a circuit in which an auxiliary resistor element circuit is incorporated into the circuit represented in FIG. 11.

FIG. 12 shows a variation of the circuit represented in FIG. 11 that includes an auxiliary resistor Z1 which comprises one or more Positive Temperature Coefficient (PTC) or Negative Temperature Coefficient (NTC) resistors, of a fixed or variable value, or alternatively two or more differently characterized resistors in serial, parallel, or compound serial/parallel combination, and an optional, serially connected power indicator L200. The auxiliary resistor is connected in parallel with heat generating resistor R1 and the usually closed thermo-sensitive circuit breaker TS1 to form a unit, module, or enclosure PK1, or alternatively is parallel connected with resistor R1 and conduit breaker TS1 and housed in a tightly sealed or partially sealed space so as to be thermo-coupled to each other. The auxiliary resistor Z1 cause auxiliary heat to be produced to enable charging at lower ambient temperatures, so that the impact of lower ambient temperatures upon operation of the usually closed thermo-sensitive circuit breaker. TS1 is kept to a minimum. Conductive contacts or plug/socket assemblies P1, P2 with two-conductive interfaces are mounted between the rechargeable cell B1 and the charging power supply. To offer temperature compensation in environments having dissimilar temperature conditions, one end of the auxiliary resistor Z1 is connected to the negative polarity terminal of the power supply, or to the positive polarity terminal (or to the negative polarity terminal of the rechargeable cell to which a serial connection has been made with the usually closed thermo-sensitive circuit breaker), and the other end of the auxiliary resistor Z1 is connected to the other end of the opposite polarity terminal on the rechargeable cell B1. In addition, to prevent the rechargeable cell B1 from discharging in the reverse direction byway of the auxiliary resistor Z1, insulation may be secured by the incorporation of an insulation diode CR2. More specifically:

1. the diode CR2 may be provided in a forward series connection between the power supply side of the auxiliary resistor Z1 and the side of the A.C. power supply connected to the rectifier RCIOO from which D.C. is output in order for the auxiliary resistor Z1 to acquire the D.C. power supply as needed and to serve at the same time to prevent reverse discharge of the rechargeable cell B1; or
2. the diode CRO may be provided in a forward series connection between the power supply end of the auxiliary resistor Z1 and in common with the D.C. output terminal of the rectifier RC100 from which the charging power supply is input, and eventually to the charging power side of the conductive contact or plug/socket assembly P1, thereby serving to prevent reverse discharge from the rechargeable cell B1.

Figure 13:
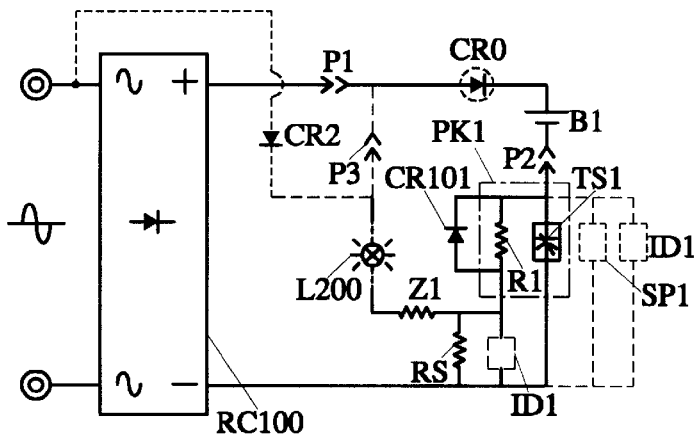
FIG. 13 is a diagram of a circuit in which the auxiliary resistor element that is incorporated into the circuit represented in FIG. 11 is connected in series with a display means.

In addition, instead of directly connecting the auxiliary resistor Z1 in parallel with the charging power supply, or by means of conductive contacts or plug/socket assemblies to the same charging power supply, as shown in FIG. 12, an alternative approaches as shown in FIG. 13, in which a power indicator L200 is installed in series with diode CR2 and auxiliary resistor Z1, and parallel connected only if necessary to one end of the A.C. power supply and to the opposite polarity on the D.C. output terminal of the rectifier RC100 (with the example shown in FIG. 13, it is the negative polarity terminal), to thereby supply current to the display ID1, the display ID1 being connected in parallel if appropriate with a current splitting resistor RS. Across both ends of the heat generating resistor R1 may be installed a diode CR101 in reverse direction relative to the continuous trickle current, so as to bypass the current coming from the auxiliary resistor Z1 when the usually closed thermo-sensitive circuit breaker TS1 is closed so that current feeding to the display ID1 is suspended. The display ID1 includes voltage restriction or current splitting elements as necessary and is in series with the heat generating resistor R1 as well as being parallel connected across both ends of the usually closed thermo-sensitive circuit breaker TS1, so that in the event the temperature in the usually closed thermo-sensitive circuit breaker TS1 rises to a critical point such that the contact is broken open, the electric energy conducted by the auxiliary resistor Z1 may be used to drive the display ID1.

The preferred thermostatic automatic cutoff charging device configured with the aforementioned display and relevant voltage restriction and current splitting means splits the current occasioned on resetting of the contacts on the usually closed, thermo-sensitive circuit breaker as it cools off until the rechargeable cell B1 is withdrawn, at which time power to the display ID1 is suspended forthwith, as will be understood from FIG. 13.

In the examples shown in FIGS. 11 through 13, to secure a better thermo-coupling compensation that takes into account convective differential as a function of utility environments as well as structural layout, an alternative approach to the aforementioned execution of a cooperative enclosure or a tightly sealed, partially sealed chamber housing for the heat generating resistor R1 and usually closed thermo-sensitive circuit breaker TS1, is to collocate the auxiliary resistor Z1 that is installed beside the charging power supply, as well as the heat generating resistor R1 and the usually closed thermo-sensitive circuit breaker TS1 on a common structure, or in a tightly sealed, or partially sealed common enclosure PK1.

Figure 14:
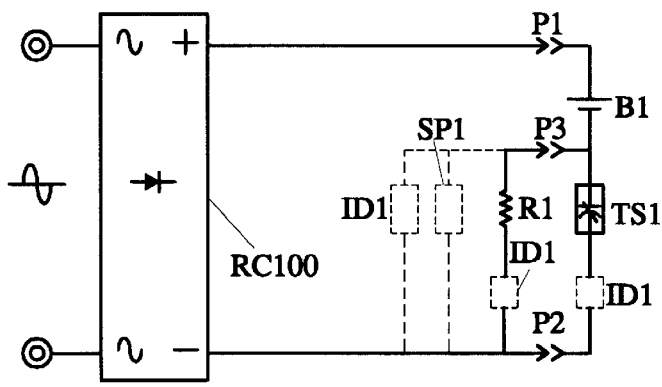
FIG. 14 is a diagram of a circuit in which the usually closed thermo-sensitive circuit breaker is established beside the rechargeable cell, and the heat generating resistor is mounted beside the charging power supply.

In the embodiment shown in FIG. 14, the usually closed thermo-sensitive circuit breaker is installed beside the rechargeable cell, and the heat generating resistor is installed beside the power supply. The structure comprises, as shown in the accompanying drawings:

Heat generating resistor R1, in the form of one or more fixed or variable resistors, positive temperature Coefficient (PTC) or Negative Temperature Coefficient (NTC) resistors, or two or more differently characterized resistors connected in series, parallel, or compound serial/ parallel combinations, and mounted beside and in series With the charging power supply, the resistor R1 being integrated with the charging power supply circuit within the charging 30 power supply compartment H101, and the usually closed thermo-sensitive circuit breaker TS1 being connected in series with and situated beside the rechargeable cell B1 so as to be integrated with the housing H102 for the rechargeable cell B1, the heat generating resistor R1 and the usually closed thermo-sensitive circuit breaker TS1 further being directly parallel connected or parallel connected by means of conductive contacts or plug/socket assemblies P1, P3 when the structures on which both are bound are combined together to form a totally or partially sealed chamber when the combination takes place; since the heat generating resistor R1 is mounted on the charging power supply side, and the usually closed thermo-sensitive circuit breaker TS1 is mounted on the rechargeable cell side, both will combine in parallel to form a thermocouple when charging is taking place so that once the rechargeable cell B1 reaches saturation concurrent with production of heat such that the usually closed thermo-sensitive circuit breaker TS1 is driven open, heat will be generated on the heat generating resistor R1 due to the topping current coming from said rechargeable cell, thereby compelling the usually closed thermo-sensitive circuit breaker TS1 into an open condition, the impedance of the heat generating resistor R1 meanwhile serving to set a limit to the level of the topping current originating from the rechargeable cell B1, both ends of the thermo-sensitive circuit breaker TS1 beside the rechargeable cell, or those ends of the heat generating resistor beside the charging power supply, optionally being parallel connected with a display ID1 whereby electric energy may be converted into audio or video signals, and which incorporates required voltage restrictor or current splitting means, or alternatively display ID1 being connected in series with the heat generating resistor R1, or where preferred, initially in parallel with a current splitting resistor RS and then in series with the heat generating resistor R1, before being parallel connected across both ends of the usually closed thermo-sensitive circuit breaker TS1, to indicate completion of a charging operation, or alternatively a prior art conductive contact protection means S21 may be incorporated additionally to inhibit electromagnetic interference due to current prevailing once the conductive contacts on the usually closed thermo-sensitive circuit breaker are cut open, and to protect the conductive contacts themselves;

A charging power supply in the form of a conventional prior art D.C. power supply or one D.C. source converted from a regular A.C. source through rectification;

A rectifier RC100 in which a single phase or multiple phase A.C. power source or center-tapped A.C. source is rectified into full-wave, half-wave D.C. form, and executed as a rectification diode or bridge rectifier.

Figure 15:
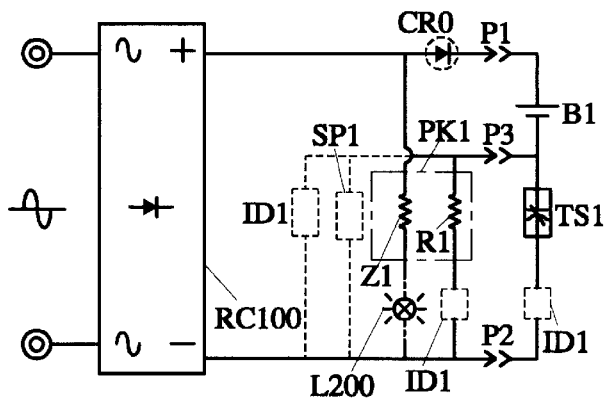
FIG. 15 is a diagram of a circuit in which the auxiliary resistor element is incorporated into the circuit represented in FIG. 14.

An example of the circuit of FIG. 14 that includes an auxiliary resistor circuit is shown in FIG. 15. The auxiliary resistor Z1 may consist one or more Positive Temperature Coefficient (PTC) or Negative. Temperature Coefficient (NTC) resistors or two or more differently characterized resistors in serial or parallel connection or compound serial/parallel combination, and is mounted adjacent the charging power supply, the usually closed thermo-sensitive circuit breaker being mounted beside the rechargeable cell and parallel connected with the charging power supply such that when the resistor R1 combined with the usually closed thermo-sensitive circuit breaker TS1, a thermocouple is established in the totally sealed or partially sealed space confined by the common structure, to the effect that auxiliary heat is produced when low temperature charging is taking place, so as to minimize the impact of a low temperature charging environment upon operation of the usually closed thermo-sensitive circuit breaker TS1.

Figure 16:
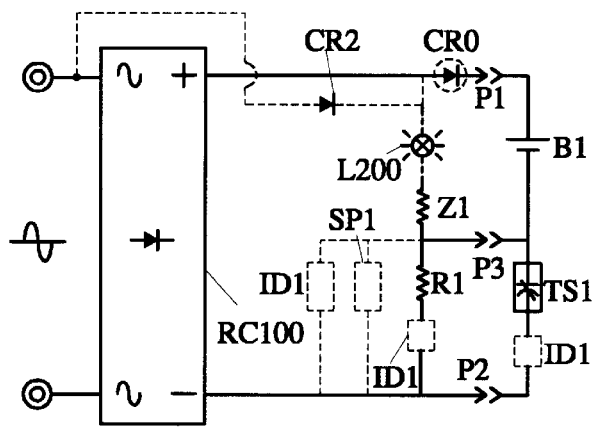
FIG. 16 is a diagram of a circuit in which the auxiliary resistor element and the heat generating resistor are connected in series before being parallelled with the charging power supply circuit.

As an alternative approach, the auxiliary resistor Z1 may be directly connected series with the heat generating resistor R1 for mutual parallel connection across the charging power supply, as shown in FIG. 16, with one terminal of the auxiliary resistor Z1 connected to one terminal, positive or negative, on the rechargeable cell B1 by means of the conductive contact or plug/socket assembly on the structure beside the rechargeable cell while the other terminal is connected to the other end of the opposite polarity terminal on the rechargeable cell B1 by means of the corresponding conductive contact or plug/socket assembly, so as to offer temperature compensation in a low temperature charging environment. In addition, to prevent the rechargeable cell B1 from reverse charging the auxiliary resistor Z1, an insulation diode CR2 may be incorporated if needed to achieve isolation, in one of the two following ways 1. forward serial connection of the insulation diode CR2 between the power supply end of the auxiliary resistor Z1 and the A.C. power outlet of the rectifier RC100 installed to yield a D.C. power supply, so as to provide the auxiliary resistor Z1 with the D.C. source it needs while serving also to prevent reverse discharging of the rechargeable cell B1;

2. forward serial connection of an insulation diode CR0 between the power outlet end of the auxiliary resistor Z1 and the D.C. output end of the charging power supply through the rectifier RC100, passing from the common contacts to the charging power side of the conductive contact or plug/socket assembly P1, and thereby serving to prevent the rechargeable cell B1 from reverse discharging, as shown in FIG. 16.

In the examples represented in FIGS. 14 through 16, the usually closed thermo-sensitive circuit breaker is invariably installed beside the rechargeable cell, and the heat generating resistor is installed beside the charging power supply. Where structure so dictates, however, it is permissible to have the usually closed thermo-sensitive circuit breaker installed beside the charging power supply, and to have the heat generating resistor installed beside the rechargeable cell, such that the rechargeable cell is driven to form a thermocouple once it is loaded in a charging condition.

Figure 17:
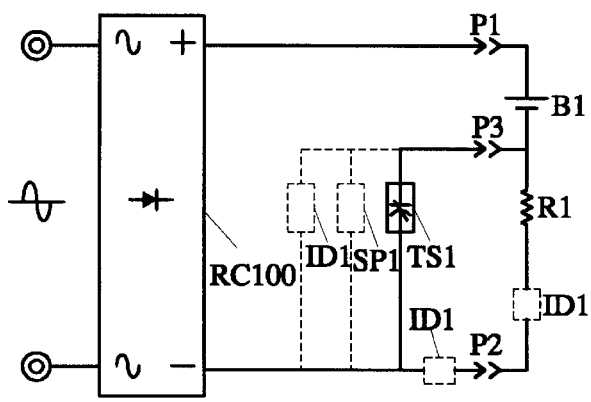
FIG. 17 is a diagram of a circuit in which the usually closed heat sensitive circuit breaker is situated on the charging power supply side and the heat generating resistor is situated on the rechargeable cell side.

FIG. 17 shows an embodiment of the invention wherein the usually closed thermo-sensitive circuit breaker is installed by the charging power supply side, and the heat generating resistor is installed by the rechargeable cell side, the embodiment of FIG. 17 including:

Heat generating resistor R1 in the form of one or more fixed or variable resistors, Positive Temperature Coefficient (PTC) or Negative Temperature Coefficient (NTC) resistors, or two or more differently characterized resistors in serial, parallel, or compound serial/parallel combination. When the resistor R1 is parallel connected with the usually closed thermo-sensitive circuit breaker TS1 by means of a conductive contact or plug/socket assembly, a mutual thermocouple will be formed in the totally or partially sealed space therein created, with the usually closed thermo-sensitive circuit breaker TS1 and the charging power supply both accommodated in the housing at the charging power side H101, the heat generating resistor R1 forming another entity together with rechargeable cell B1 and the housing H102, such that in a state of charging operation the usually closed thermo-sensitive circuit breaker TS1 thermally couples with the heat generating resistor R1, the conductive contacts or plug/socket assembly structurally integral therewith being in parallel with and thermo-coupled to both ends of the usually closed thermo-sensitive circuit breaker TS1 so that the usually closed thermo-sensitive circuit breaker TS1, in series with the charging power supply, becomes conductive as the rechargeable cell B1 as loaded in the housing by way of conductive contacts or plug/socket assembly, and such that when the rechargeable cell B1 is charged to saturation concurrent with release of heat, the thermocouple thereupon formed will compel the usually closed thermo-sensitive circuit breaker TS1 to open, whereupon the heat generating resistor R1, by the passing of a topping current originating from the rechargeable cell B1, will produce heat and, because of the thermocouple active, maintain the usually closed thermo-sensitive circuit breaker TS1 in a heat-induced open state, the heat generating resistor R1 by its impedance limited the topping current released by the rechargeable cell B1; across both ends of the usually closed thermo-sensitive circuit breaker TS1 by the charging power side, or across the ends of the heat generating resistor R1 beside the cell, may be optionally installed a display means ID1 capable of converting electric energy into audio or video signals and incorporating necessary voltage restriction or is current splitting means, the display ID1 being connected in series with the heat generating resistor R1, or alternatively in parallel with splitting resistor RS before being connected in series with the heat generating resistor R1 and then parallel connected across the usually closed thermo-sensitive circuit breaker TS1 to indicate completion of a charging operation, the circuit of this embodiment optionally still further incorporating a prior art conductive contact protector S21 to inhibit electromagnetic interference occasioned by the current arising on cutoff of the usually closed thermo-sensitive circuit breaker 25 conductive contact, and to protect such conductive contacts as well;

Achieving power supply in the form of a conventional prior art D.C. source or one converted by rectification from a regular A.C. source;

A rectifier RC100 in the form of a rectification diode or a bridge rectifier capable of rectifying a single phase or multiple phase or center-tapped A.C. source into a full-wave, half-wave D.C. output.

Figure 18:
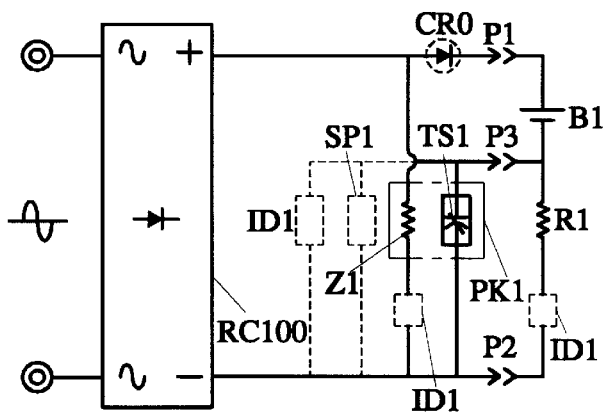
FIG. 18 is a diagram of a circuit in which an auxiliary resistor element circuit is incorporated into the circuit represented in FIG. 17.

FIG. 18 shows an example of the auxiliary resistor schema as incorporated to the circuitry represented in FIG. 17. Auxiliary resistor Z1 is composed of one or more fixed or variable resistors, Positive Temperature Coefficient (PTC) or Negative Temperature Coefficient (NTC) resistors, or two or more differently characterized resistors in serial, parallel or compound serial/parallel combination, and is connected in parallel with the charging power supply, to form a composite enclosure PK1 with the usually closed thermo-sensitive circuit breaker TS1. Alternatively, the usually closed circuit breaker TS1 may be established in the charging power supply side structure and the heat generating resistor R1 may be established in the rechargeable cell side structure and jointly accommodated in a fully sealed or partially sealed chamber. In either case, when the auxiliary resistor and circuit breaker are combined together, and thereby thermally coupled, auxiliary heat is produced in a low temperature charging environment so as to minimize impact of the low temperature environment upon the operation of the usually closed thermo-sensitive circuit breaker. In addition, to prevent the rechargeable cell B1 from discharging reversely by way of the auxiliary resistor Z1, isolation may be provided by the incorporation of an insulation diode CR2, as an option, in the circuitry, in one of the following ways:

1. Insulation diode CR2 may be forwardly connected between the power supply end of the auxiliary resistor Z130 and the A.C. terminal to the rectifier RC100 through which D.C. power is supplied so that the D.C. required by the auxiliary resistor ZI is procured, while serving also to prevent reverse discharging from the rechargeable cell B1; or 2. Forward serial incorporation of insulation diode CR0 between the power outlet end of the auxiliary resistor Z1 and the D.C. output end of the charging power supply through the rectifier RC100, via common contacts on the charging power side of the conductive contact or plug/socket assembly P1, thereby serving to prevent the rechargeable cell B1 from reverse discharge.

Figure 19:
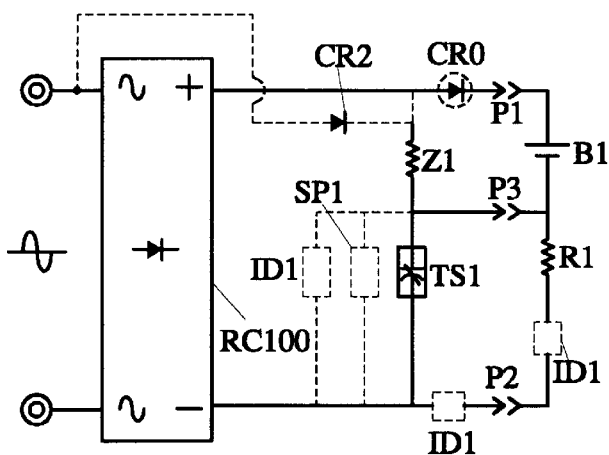
FIG. 19 is a diagram of a circuit in which the auxiliary resistor element incorporated into the circuit represented in FIG. 17 is connected in series with the usually closed thermo-sensitive circuit breaker before being parallelled with the charging power supply circuit.

As an alternative to being connected directly in parallel with the charging power supply, such as is shown in FIG. 18, the auxiliary resistor Z1 may be connected in series with the usually closed thermo-sensitive circuit breaker TS1, and then parallel connected across the D.C. charging power supply, as illustrated in FIG. 19.

Figure 20:
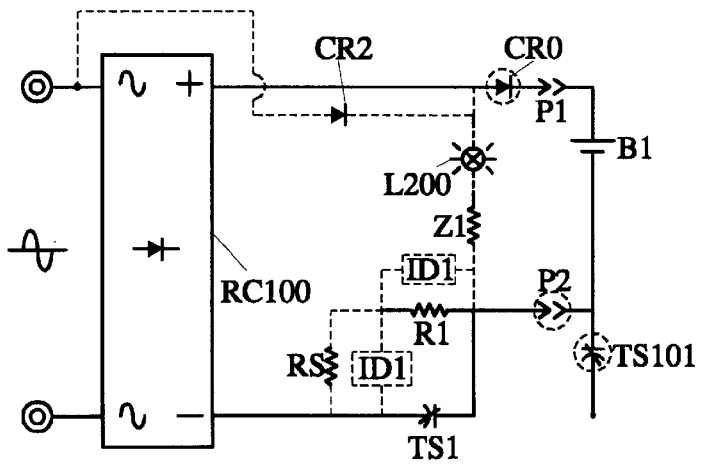
FIG. 20 is a circuit diagram of a dual purpose circuit pursuant to a preferred embodiment of the invention.

By and large, in addition to a positive/negative interface that facilitates delivery and input of electric energy as required by common rechargeable cell specifications, the invention may also be applied to a dual purpose interfacing structure by means of the addition of a second usually closed thermo-sensitive circuit breaker TS101, as shown in FIG. 20. This thermostatic automatic cutoff charging device may have a usually closed thermo-sensitive circuit breaker TS1 and relevant circuits installed in the charging power side structure, to serve serving as a charging/recharging circuit compatible with either of the interfacing structures discussed above, whereby permitting coupling either (1) directly or by way of conductive contacts or plug/socket assembly with the rechargeable cell B1 to achieve thermo-sensitized cutoff once the charging reaches saturation, or (2) with or matched to a rechargeable cell B1 which is already complete with a usually closed thermo-sensitive circuit breaker TS101 for the purpose of thermo-sensitized cutoff once the charging or recharging has reached its saturation.

As illustrated in FIG. 20, a usually closed thermo-sensitive circuit breaker TS1 on the charging power supply side structure is perfectly thermally with the rechargeable cell and connected in series with the charging power supply, and in parallel via conductive contacts or plug/socket assembly P1, P3 with rechargeable cell B1 across its positive/negative terminals, one serving to feed out power and another to feed in power. The output terminal of the usually closed thermo-sensitive circuit breaker TS101 is left open, while the usually closed thermo-sensitive circuit breaker TS1 is parallel connected at both ends with heat generating resistor R1.

Optionally, the structure abutting upon the usually closed thermo-sensitive circuit breaker shown in FIG. 20 may incorporate an auxiliary resistor Z1 composed of one or more fixed or variable resistors, Positive Temperature Coefficient (PTC) or Negative Temperature Coefficient (NTC) resistors, or two or more differently characterized resistors in series, parallel, or compound serial/parallel combination, plus a power indicator L200 connected in series where called for in the circuitry, the auxiliary resistor being parallel connected with the charging power supply and forming a cooperative enclosure PK together with the heat generating resistor R1 and the usually closed thermo-sensitive circuit breaker TS1, or alternatively, the auxiliary resistor being jointly accommodated in a totally or partially sealed chamber to facilitate mutual thermo-coupling. As a result, auxiliary heat is produced in a low temperature charging environment with a view to minimizing impact of the low temperature environment upon the operation of a usually closed thermo-sensitive circuit breaker. The auxiliary resistor Z1 may also be connected in series with the usually closed thermo-sensitive circuit breaker TS1 and thence in parallel across the D.C. charging power supply. A display ID1 featuring additional voltage restriction or current division means may be optionally connected in parallel with a current division resistor RS, in series with the heat generating resistor R1 and thence in parallel across the usually closed thermo-sensitive circuit breaker TS1, or alternatively in parallel with the heat generating resistor R1 and display ID1 driven by a corresponding voltage restriction or current divisor, and that followed by parallel connection across the usually closed thermo-sensitive circuit breaker TS1, so that once the usually closed contact opens, electric energy can by way of the auxiliary resistor Z1 drive the display ID1 in which the necessary voltage restriction or current divisor has been incorporated. Bypass current which prevails when the usually closed thermo-sensitive circuit breaker cools off and the contact point resets to closure is, on the other hand, not supplied to the display ID1. To prevent the rechargeable cell B1 from reverse discharging via the auxiliary resistor Z1, an insulation diode CR2 may optionally also be incorporated to serve isolation purposes, as follows:

1. forward serial incorporation of an insulation diode CR2 between the power supply end of the auxiliary resistor Z1 and the A.C. power outlet of the rectifier RC100 installed to yield a D.C. power supply, so as to provide the auxiliary resistor ZI with the D.C. source it needs while serving also to prevent reverse discharging of the rechargeable cell B1;
2. forward serial incorporation of insulation diode CRO between the power outlet end of the auxiliary resistor Z1 and the D.C. output end of the charging power supply through the rectifier RC100, and passing from the common contacts to the charging power side of the conductive contact or plug/socket assembly P1 so as prevent the rechargeable cell B1 from reverse discharging.

In the example illustrated in FIG. 20, the saturation heating effect on the part of the rechargeable cell may be exploited, regardless of the presence or absence of a usually closed thermo-sensitive circuit breaker TS101 therein, to cut off the usually closed thermo-sensitive circuit breaker TS1 that is integral with the charging power supply side structure, the ongoing heated condition of the heat generating resistor enabling the usually closed thermo-sensitive circuit breaker to continue to maintain its heat-on cutoff condition.

Figure 21:
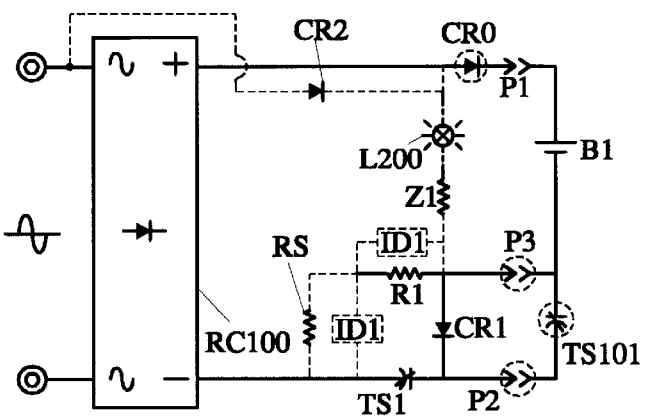
FIG. 21 is a circuit diagram of a variation of the dual purpose circuit of FIG. 20.

Another embodiment of the invention involving a dual purpose circuit is shown in FIG. 21. This embodiment provides essentially for a usually closed thermo-sensitive circuit breaker TS1 integral with the charging power supply side structure and which forms a perfect thermocouple with the rechargeable cell, the charging power supply being connected in series with the usually closed thermo-sensitive circuit breaker TS1. One terminal of the power supply is connected to one conductive pin of an opposite polarity terminal relative to the rechargeable cell B1 via conductive contact or plug/socket assembly P1, whereas the other end of the usually closed thermo-sensitive circuit breaker TS1, which is in series with the power supply, is connected to the output end of the usually closed thermo-sensitive circuit breaker TS101 that is in series with the conductive contact on the other end of the rechargeable cell B1 by way of conductive contact or plug/socket assembly P2. One end of the heat generating resistor R1 is connected to the common connection between the usually closed thermo-sensitive circuit breaker TS1 and the charging power supply, whereas the other end is guided to the power supply side of the conductive contact or plug/socket assembly P3, the load side of the conductive contact or plug/socket assembly P3 being further guided to the common connection between the rechargeable cell B1 and the usually closed thermo-sensitive circuit breaker TS101. Between the charging power supply sides of each of the conductive contacts or plug/socket assemblies P2, P3, is installed a diode CR1 in a direction corresponding to the charging current running direction, for the passage of charging current when the rechargeable cell B1 is used without the usually closed thermo-sensitive circuit breaker TS101.

As a further variant, the example illustrated in FIG. 21 provides for a usually closed thermo-sensitive circuit breaker TS1 on the charging power supply side which forms a perfect thermocouple with the rechargeable cell, the charging power supply being in series with the usually closed thermo-sensitive circuit breaker TS1. One end of the power supply is connected to one of number of pins of the opposite polarity on the rechargeable cell B1 by way of a conductive contact or plug/socket assembly P1, the other end of the power supply being connected to the usually closed thermosensitive circuit breaker TS1, and to the output end of the usually closed thermo-sensitive circuit breaker TS101 that is in series with a conductive contact on the other end of the rechargeable cell B1 by way of conductive contact or plug/socket assembly P2. One end of the heat generating resistor R1 is connected to the common connection between the usually closed thermo-sensitive circuit breaker TS1 and the charging power supply, and the other end of resistor R1 is connected to the power side of the conductive contact or plug/socket assembly P3. The load side of the conductive contact or plug/socket assembly P3 is connected the common interface between the rechargeable cell B1 and the usually closed thermo-sensitive circuit breaker TS101, and a diode CR1 is interposed in the direction in which the charging current flows between the charging power sides of the conductive contacts or the plug/socket assemblies P2, P3, so that charging current will be allowed to pass in the event the rechargeable cell B1 in use is not equipped with a usually closed thermo-sensitive circuit breaker TS101.

In addition, in the embodiment shown in FIG. 21, it is preferable to install, on the structure close by the usually closed thermo-sensitive circuit breaker, an auxiliary resistor Z1, in the form of one or more fixed or variable resistors, Positive Temperature Coefficient (PTC) or Negative Temperature Coefficient (NTC) resistors, or two or more differently characterized resistors in serial or parallel connection or in compound serial/parallel combination. A power indicator L200 is installed where needed in the application, and set in parallel with the charging power supply, the auxiliary resistor cooperating to form a unit, module, or enclosure PK1 with the heat generating resistor R1 and the usually closed thermo-sensitive circuit breaker TS1, or instead being collocated in a totally or partially sealed enclosure for mutual thermo-coupling, so as to produce auxiliary heat in a low temperature charging environment and thereby minimize impact of the low temperature environment upon operation of the usually closed thermo-sensitive circuit breaker TS1. As an alternative approach, the auxiliary resistor Z1 may be connected in series with the diode CR1 and in series with the usually closed thermo-sensitive circuit breaker TS1, and in that configuration, made parallel with a D.C. power supply. Optionally, a display ID1 with associated voltage restriction or current division means is connected in parallel with a current divisor resistor RS, in series with the heat generating resistor R1, and in parallel across the usually closed thermo-sensitive circuit breaker. Alternatively the display ID1 together with requisite voltage restriction or current divisor may be connected in parallel with the usually closed thermo-sensitive circuit breaker TS1 across both ends, in order that once the usually closed contacts open, electric energy may, by means of the auxiliary resistor Z1, drive the display TD1 and integral voltage restriction or current-divisor so that a bypass current occurs when the usually closed thermo-sensitive circuit breaker cools off and the contact resets to closure, and power to the display ID1 is suspended altogether. To prevent the rechargeable cell B1 from reverse discharge by way of the auxiliary resistor Z1, an isolation diode CR2 may be inserted where justified in the application to serve isolation purposes, in the following manner:
1. by forward connection of the isolation diode CR2 between the power supply end of the auxiliary resistor Z1 and the A.C. power supply end, thereby enabling the rectifier RC100 installed to provide D.C. charging energy, the auxiliary resistor Z1 serving also to prevent leverse discharge of the rechargeable cell B1;
2. by forward connection of isolation diode CRO between the power supply end of the auxiliary resistor Z1 and the D.C. outlet of the rectifier RC100 relative to the charging power supply and to the charging power supply side of the conductive contact or plug/socket assembly P1, thereby serving to prevent reverse discharge of the rechargeable cell B1.

By appropriate selection of the differential between the operating temperatures and temperature reception gradients of both usually closed thermo-sensitive circuit breakers TS1 and TS101, the following operation procedures are made available:

A. In applications where the rechargeable cell B1 is not equipped with a usually closed thermo-sensitive circuit breaker TS101:
   1. The usually closed thermo-sensitive circuit breaker TS1, which is part of the structure close by the charging power supply side, will open by the heat that is released as charging in the rechargeable cell B1 reaches its saturation, while the heat generating resistor R1, upon passing of a trickle current, will produce heat. The continued receiving of heat by the usually closed circuit breaker TS1, will eventually cause it to open, completing the charging cycle;

B. In applications where the rechargeable cell B1 is equipped with a usually closed circuit breaker TS101:
   1. The usually closed thermo-sensitive circuit breaker TS1, which is part of the structure adjacent the charging power supply side, will open by the heat released as charging in the rechargeable cell B1 reaches its saturation, while the heat-generating resistor R1, due to the passing of a trickle current, will produce heat, the resulting continued receiving of heat by the usually closed circuit breaker TS1 eventually causing it to open, completing the charging cycle;
   2. In the event the usually closed thermo-sensitive circuit breaker TS101 for the rechargeable cell B1, affected by the heat, cuts off first then the charging current will continue passing through diode CR1, bringing about transfer of heat to the usually closed thermo-sensitive circuit breaker TS1 which forms part of the structure close by the charging power supply, such that as the circuit breaker TS1 duly affected by the heat, it eventually opens, that is, whether or not the rechargeable cell is itself equipped with a usually closed thermo-sensitive circuit breaker TS1, the thermal effect owing to the saturation of the rechargeable cell will suffice to open the usually closed thermo-sensitive circuit breaker TS1 which forms part of the structure close by the charging power supply. The heat released by the heat generating resistor R1 then serves to maintain the usually closed thermo-sensitive circuit breaker to completion of charging in a thermally open state.

Figure 22:
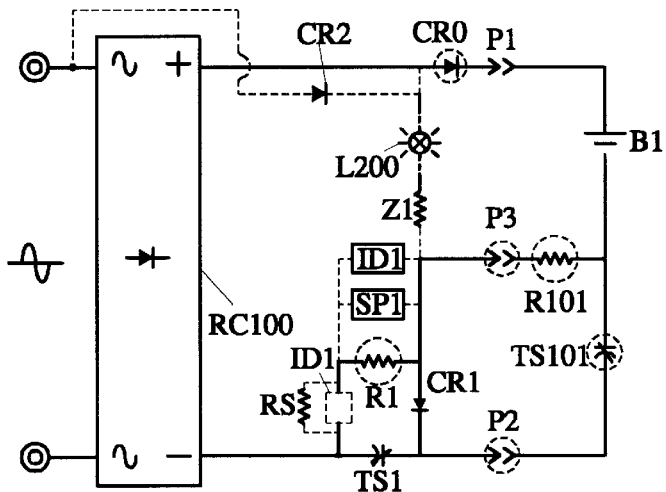
FIG. 22 is a diagram of a circuit in which the auxiliary resistor element shown in FIG. 21 is established beside the rechargeable cell.

The embodiment illustrated in FIG. 21 may be adapted to what is shown in 22 by connecting one end of an auxiliary resistor R101 to the conductive contact or plug/socket assembly 23, the other end thereof being set in a triplicate connection together with one of the conductive pins so that electric power is conducted to and from the rechargeable cell B1, and to one end of the usually closed thermo-sensitive circuit breaker TS101, to make a perfect thermocouple with the usually closed circuit breaker TS1 or TS101 or alternatively for current restriction purposes, as appropriate. This use of the source of heat is especially efficient and promotes thermal conservation, as is evident from FIG. 22.

Figure 23:
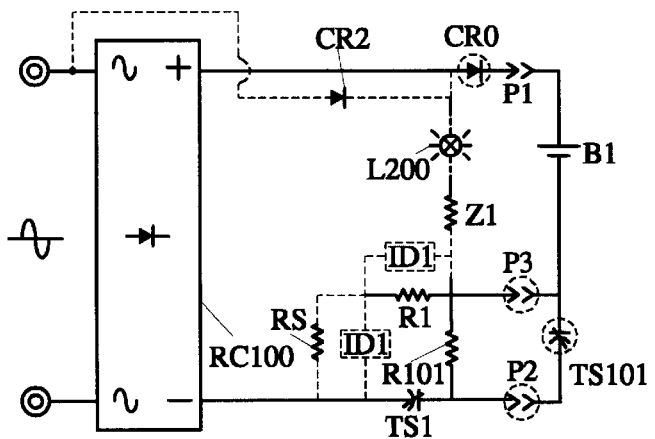
FIG. 23 is a circuit diagram of a third example of a dual purpose circuit pursuant to a preferred embodiment of the invention.

A third illustration of the dual purpose circuit pursuant to the invention is shown in FIG. 23, with the theme being the incorporation of a usually closed thermo-sensitive circuit breaker TS1 on the structure close by the charging power supply side that makes a perfect thermocouple with the rechargeable cell, the charging power supply being in series with the usually closed thermo-sensitive circuit breaker TS1. One end of the power supply is connected to one of a number of pins of opposite polarity on the rechargeable cell B1 by way of conductive contact or plug/socket assembly P1, and the other end of the power supply being connected to the other end of the usually closed thermo-sensitive circuit breaker TS1, that end also being connected to the output terminal of the usually closed thermo-sensitive circuit breaker TS101 that is in series with a conductive contact on the other end of the rechargeable cell BI by way of conductive contact or plug/socket assembly P2. One end of the heat generating resistor R1 is connected to the common interface between the usually closed thermo-sensitive circuit breaker TS1 and the charging power supply, the other end thereof being connected to the power side of the conductive contact or plug/socket assembly P3, and the load side of the conductive contact or plug/socket assembly P3 being connected to the common interface between the rechargeable cell B1 and the usually closed thermo-sensitive circuit breaker TS101. Since the auxiliary resistor R101 is parallel connected across the charging power supply side of the conductive contact or plug/socket assembly P2, P3, charging current will be allowed to pass in the event the rechargeable cell B1 in use is not equipped with a usually closed thermo-sensitive circuit breaker TS101.

In addition, in the embodiment shown in FIG. 23, it is preferable to install, on the structure close by the usually closed thermo-sensitive circuit breaker, an auxiliary resistor Z1 in the form of one or more fixed or variable resistors, Positive Temperature Coefficient (PTC) or Negative Temperature Coefficient (NTC) resistors, or two or more differently characterized resistors in serial, parallel, or in compound serial/parallel combination. The auxiliary resistor Z1 is set in parallel with the charging power supply, while forming a cooperative enclosure PK1 with the heat generating resistor R1 and the usually closed thermo-sensitive circuit breaker TS1, or instead is jointly collocated in a totally or partially sealed enclosure for mutual thermocoupling, so as to produce auxiliary heat in a low temperature environment upon operation of the usually closed thermo-sensitive circuit breaker TS1. As an alternative approach the auxiliary resistor Z1 may be connected in series with the diode CR1 and with the usually closed thermo-sensitive circuit breaker TS1, and thus made parallel with a D.C. power supply. Optionally, a display ID1 with associated voltage restriction or current division means is connected in parallel with a current divisor resistor RS, thence in series with the heat generating resistor R1, and thence in parallel across the usually closed thermo-sensitive circuit breaker. Alternatively, the display ID1 together with a requisite voltage restrictor or current divisor is connected in parallel with the usually closed thermo-sensitive circuit breaker TS1 across both ends, so that once the usually closed contact opens, electric energy may by way of the auxiliary resistor Z1 drive the display ID1, and so that a bypass current takes form when the usually closed thermo-sensitive circuit breaker cools off and the contact resets to closure, power to the display ID1 being suspended altogether. Also, to prevent the rechargeable cell B1 from reverse discharge by way of the auxiliary resistor Z1, an isolation diode CR2 may be inserted where justified in the application to serve isolation purposes, either by:

1. forward connection an insulation diode CR2 between the power supply end of the auxiliary resistor Z1 and the A.C. power supply end enabling the rectifier RC100 to provide D.C. charging energy, the auxiliary resistor Z1 serving also to prevent reverse discharge of the rechargeable cell B1;

2. or forward connection of an insulation diode CR0 between the power supply end of the auxiliary resistor Z1 and the D.C. outlet of the rectifier RC100 in relation to the charging power supply, and to the charging power supply side of the conductive contact or plug/socket assembly P1, thereby serving to prevent reverse discharge of the rechargeable cell B1.

By appropriately selecting the differential between the operating temperature and temperature reception gradients of both usually closed thermo-sensitive circuit breakers TS1 and TS101, the following operation procedures are made available:

A. In applications where the rechargeable cell B1 is not equipped with a usually closed thermo-sensitive circuit breaker TS101:
  1. The usually closed thermo-sensitive circuit breaker TS1, which is part of the structure close by the charging power supply side, will open by the heat that is released as charging in the rechargeable cell B1 reaches its saturation, while the heat generating resistor R1, due to passing of a trickle current, will produce heat that causes the usually closed circuit breaker TS1 to eventually open, and the charging cycle to be completed;

B. In applications where the rechargeable cell B1 itself is equipped with a usually closed circuit breaker TS101:
  1. The usually closed thermo-sensitive circuit breaker TS1, which is part of the structure close by the charging power supply side, will open due to the heat that is released as charging in the rechargeable cell B1 reaches its saturation, while the heat generating resistor R1, due to the passing of a trickle current, will produce heat that causes the usually closed circuit breaker TS1, to eventually open, and the charging cycle to be completed;
  2. In the event that the usually closed thermo-sensitive circuit breaker TS101 forthe rechargeable cell B1, affected by the heat, cuts off first, then the charging current will continue passing the diode CR1, bringing about transfer of heat to the usually closed thermo-sensitive circuit breaker TS1 which forms part of the structure close by the charging power supply, such that the circuit breaker TS1 duly affected by the heat eventually opens, that is, whether or not the rechargeable cell is itself equipped with a usually closed thermo-sensitive circuit breaker TS101, the thermal effect owing to the saturation of the rechargeable cell will suffice to open the usually closed thermo-sensitive circuit breaker TS1 which forms part of the structure close by the charging power supply, the heat released by the heat generating resistor R1 serving to maintain the usually closed thermo-sensitive circuit breaker to completion of charging in a thermally open state.

Figure 24:
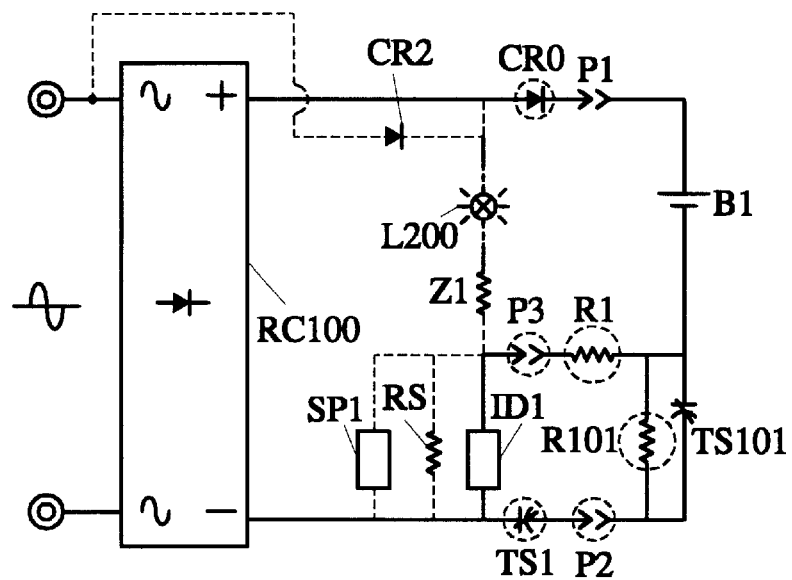
FIG. 24 is a diagram of a circuit in which the auxiliary resistor element shown in FIG. 23 is established beside the rechargeable cell.

The embodiment shown in FIG. 23 can be adapted to what is shown in FIG. 24 by connecting one end of the heat generating resistor R1 to the conductive contact or plug/socket assembly P3, the other end thereof being connected to one of the conductive pins by which the rechargeable cell B1 is accessed for input/output, and to an end of the usually closed thermo-sensitive circuit breaker TS101. Also, an auxiliary resistor R101 may be connected across both ends of the usually closed thermo-sensitive circuit breaker TS101, both or one of the aforementioned heat generating resistor R1 and auxiliary resistor R101 forming a perfect thermocouple with the usually closed circuit breaker TS1 or TS101 to thus account for a source of heat for thermal conservation purposes.

Figure 25:
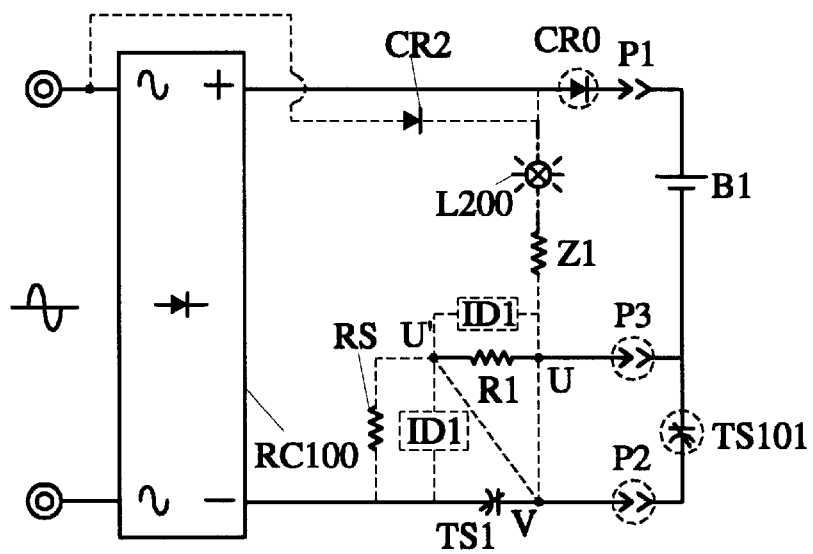
FIG. 25 is a circuit diagram of a fourth example of a dual purpose circuit pursuant to a preferred embodiment of the invention.

A fourth example of the dual purpose circuit according to the invention is illustrated in FIG. 25, with the theme being the incorporation of a usually closed thermo-sensitive circuit breaker TS1 on the structure close by the charging power supply side that makes a perfect thermocouple with the rechargeable cell, the charging power supply being in series with the usually closed thermo-sensitive circuit breaker TS1. One end of the power supply is connected to one of a number of pins of the opposite polarity on the rechargeable cell B1 by means of conductive contact or plug/socket assembly P1, with the power supply being connected to the other end of the usually closed thermo-sensitive circuit breaker TS1, that end being also connected to the output terminal of the usually closed circuit breaker TS101 that is in series with the conductive contact on the other end of the rechargeable cell B1 by way of conductive contact or plug/socket assembly P2. One end of the heat generating resistor R1 is connected to the common interface between the usually closed thermo-sensitive circuit breaker TS1 and the charging power supply, and the other end is connected to the power side of the conductive contact or plug/socket assembly P3, the load side of the conductive contact or plug/ socket assembly P3 being connected to the common interface between the rechargeable cell B1 and the usually closed thermo-sensitive circuit breaker TS101. By shorting point U with point V on the charging power supply side of the aforementioned conductive contacts or plug/socket assembly P2 and P3, the circuit can be used to limit charging of the rechargeable cell B1 with the same effectiveness whether or not the rechargeable cell is equipped with a usually closed thermo-sensitive circuit breaker TS101.

In addition, in the embodiment shown in FIG. 25, it is preferable to install, on the structure adjacent the usually closed thermo-sensitive circuit breaker, an auxiliary resistor Z1 of the type described above, as well as power indicator L200 where needed in the application, the resistor Z1 being connected in parallel with the charging power supply, while cooperatively forming an enclosure PK1 with the heat generating resistor R1 and the usually closed thermo-sensitive circuit breaker TS1, or instead being commonly located in a totally or partially sealed enclosure for mutual thermo-coupling, so as to produce auxiliary heat in a low temperature charging environment, thereby minimizing impact of the low temperature environment upon operation of the usually closed thermo-sensitive circuit breaker TS1. As a further alternative approach, the auxiliary resistor Z1 may be shorted from contact U to contact V or from contact U40 to contact V' by way of conductive contacts or plug/socket assembly P2, P3, so as to be connected in series with the usually closed thermo-sensitive circuit breaker TS1 and in parallel across the D.C. charging power supply. A display ID1 with associated voltage restriction or current division means is connected in parallel with a current divisor RS, in series with the heat generating resistor R1, and then in parallel across the usually closed thermo-sensitive circuit breaker R1. Alternatively the display IDI together with the requisite voltage restrictor or current divisor is connected in parallel with the usually closed thermo-sensitive circuit breaker TS1 across both ends, in order that once the usually closed contact opens, electric energy may by way of the auxiliary resistor Z1 drive the display ID1, and so that a bypass current forms when the usually closed thermo-sensitive circuit breaker cools off and the contact resets to closure, at which time power to the display ID1 is suspended altogether. To prevent the rechargeable cell B1 from reverse discharge through the auxiliary resistor Z1, an insulation diode CR2 may be interposed where justified in the application to serve isolation purposes, either by:

1. forward connection of an insulation diode CR2 between the power supply end of the auxiliary resistor Z1 and the A.C. Power supply end that enables the rectifier RC100 to provide D.C. charging energy, and serving also to prevent reverse discharge of the rechargeable cell B1;
2. forward connection of an insulation diode CR0 between the power supply end of the auxiliary resistor Z1 and the D.C. outlet of the rectifier RC100 relative to the charging power supply, and the charging power supply side of the conductive contact or plug/socket assembly P1, thereby serving to prevent reverse discharge of the rechargeable cell B1.

In any of the examples illustrated in FIGS. 20 through 25, the saturation heating effect on the part of the rechargeable cell may be exploited, regardless of the presence or absence of a usually closed thermo-sensitive circuit breaker TS101 therein, to cut off the usually closed thermo-sensitive circuit breaker TS1 that is integral with the charging power supply side structure. Due to the ongoing heated condition of the heat generating resistor, the usually closed thermo-sensitive circuit breaker will continue to maintain its heat-on cutoff condition.

In the embodiments represented in FIG. 6 through FIG. 25, a display ID1 optionally serves to convert incoming electric energy into audio or video signals. The display and circuitry relevant thereto are described in further detail as follows:
1. It may be directly connected across the usually closed thermo-sensitive circuit breaker TS1 or TS101, in respect of which an illustration is given in FIG. 26;
2. It may be connected in series with the heat generating resistor R1 and thence in parallel across the usually closed thermo-sensitive circuit breaker TS1 or TS101, in respect of which an illustration is given in FIG. 27;
3. It may be connected in series with a voltage downgrading resistor RZ and thence in parallel across the usually closed thermo-sensitive circuit breaker TS1 or TS101, in respect of which an illustration is given in FIG. 28;
4. It may be connected in series with a voltage downgrading resistor RZ, and successively with a heat generating resistor R1, and thence in parallel across the usually closed thermo-sensitive circuit breaker TS1 or TS101, in respect of which an illustration is given in FIG. 29;
5. It may be parallel with a current divisor resistor RS followed by parallelling again with the usually closed thermo-sensitive circuit breaker TS1 or TS101 across both ends; in respect of which an illustration is given in FIG. 30;
6. It may be connected in parallel with a current divisor resistor RS, and thence in series with a heat generating resistor R1, followed by parallelling across the usually closed thermo-sensitive circuit breaker TS1 or TS101, in respect of which an illustration is given in FIG. 31;
7. It may be connected in parallel with a current division resistor RS, and thence in series with voltage downgrading resistor RZ, followed by parallelling across the usually closed thermo-sensitive circuit breaker TS1 or TS101, in respect of which an illustration is given in FIG. 32;
8. It may be connected in parallel with a current division resistor RS, and thence in series with a voltage downgrading resistor RZ and heat generating resistor R1, and only then parallel connected across the usually closed thermo-sensitive circuit breaker TS1 or TS101, in respect of which an illustration is given in FIG. 33.

Figure 34:
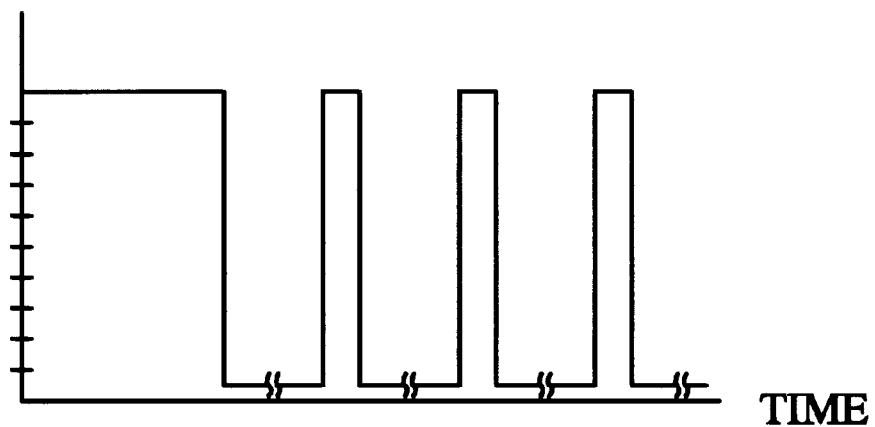
FIG. 34 is a graph illustrating the current supplied during a supplemental charging run in intermittent cycles; and, FIG. 35 is a graph illustrating the topping charge supplied by means of current passing the heat generating resistor.
Figure 35:
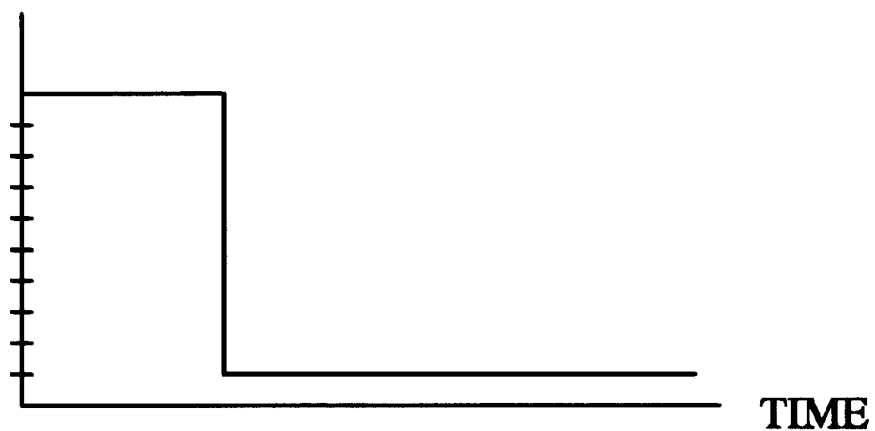

In any of the examples illustrated in FIGS. 1 through 25, by the choice of a heat generating resistor it is possible to set two sustainable modes of charging, including:

1. One in which the heat generating resistor is of a smaller thermal power material, which makes possible heating in a heat-delayed resetting manner with respect to the thermo-coupled usually closed thermo-sensitive circuit breaker TS1, so that the time for the contacts to reset to closure is duly extended, and once the usually closed contacts are reset, the rechargeable cell B1 will once again be charged to saturation and thereupon produce heat, at which time the usually closed thermo-sensitive circuit breaker, duly affected by the heat, gets broken again, thereby providing cyclic intermittent supplemental charging occasioned by heat-induced delay, in respect of which the process of supplemental, intermittent, cyclic charging is illustrated in FIG. 34;
2. One in which the heat generating resistor is of a greater thermal power, as a result of which heating with respect to the usually closed thermo-sensitive circuit breaker that is being thermo-coupled thereby will limit the trickle current from the rechargeable cell by the action of the heat generating resistor; in respect of which a sustainable charging phase is obtained by means of trickle current passing the heat generating resistor as illustrated in FIG. 35.

Moreover, since in practical applications, lots of thermo-sensitive temperature sensors actuated by charging saturation due to a rechargeable cell and circuit schema are available, to enhance operational safety, the thermostatic automatic cutoff charging device according to the invention may be subjected to detection by a detection means comprising the aforementioned heat generating resistor R1 in parallel with and thermo-coupled to the usually closed thermo-sensitive circuit breaker TS1 or TS101, provided singly or plurally at one or plural positions, or where justified may be combined with other prior art automatic cutoff provisions, the device including:

a detector which constitutes a usually closed thermo-sensitive circuit breaker in parallel with and thermo-coupled to a 30 heat generating resistor; and, an auxiliary resistor Z1, in a conductive state concurrent with release of heat when combined with the rechargeable cell B1 by way of a conductive contact or plug/socket assembly, and open when not combined with the rechargeable cell B1, and which may be parallel connected directly with the power supply to maintain a continued heating state that renders unnecessary the conductive contact or plug/socket assembly P3, ultimately achieving substantial simplification of structure;

a Positive Temperature Coefficient (PTC) or Negative Temperature Coefficient (NTC) resistor whose impedance varies with a change in temperature and which, in conjunction with an electromechanical or solid state interface switch circuit serves to control the charging power supply; or an electromechanical device or solid state circuit which detects a transient state voltage drop signal triggered by the heat occasioned by the charging saturation by which the rechargeable cell is characterized, the signal serving to control the electromechanical or solid state interface switching circuit and in turn control the charging power supply; or concurrent exploitation of the aforementioned thermo-sensitive temperature sensors with a cutoff delay timer made up of electromechanical or solid state electronic circuits, to exert joint control of the charging power supply.

The structure on the charging power supply side of the subject thermostatic automatic cutoff charging device and the structure on the rechargeable cell side thereof, where justified by the application, may include:
- a bar-pattern rechargeable cell coupled to the charging power supply side structure and arranged to resemble a beehive assembly; or,
- a block assembly of a rechargeable cell combined with a similar block assembly of a charging power supply side structure; or
- a rechargeable cell in a block structure combined with the charging power supply side structure arranged to form an open channel charging socket assembly;
- a charging power supply side structure vertically engageable with the rechargeable cell so that combination is made by pushing upwards, and so that separation is made by pushing downwards, or vice versa; or alternatively such that combination/separation is made horizontally or at any other chosen angle.

The rechargeable cell B1 to go with the subject thermostatic automatic cutoff charging device may comprise a single rechargeable cell, or two or more rechargeable cells connected in series or parallel.

A common feature of the various examples illustrated in FIG. 6 through FIG. 33 is that once the rechargeable cell B1 is charged to saturation concurrent with release of heat, the usually closed thermo-sensitive circuit breaker TS1 that is thermally coupled to the rechargeable cell B1 will, duly affected by the heat, open, after which, the trickle current that passes the heat generating resistor R1 thermally coupled to the usually closed thermo-sensitive circuit breaker TS1 will bring the heat generating resistor R1 to a heated state, so that the usually closed thermo-sensitive circuit breaker TS1 is maintained in a heat-on open state or heat-delayed intermittent open state. Having summarized the basic working principle of the invention, as illustrated particularly in FIG. 1 through FIG. 5, it is to be noted that there are many circuits to which it is possible to apply the principles of the invention, and that the invention is by no means limited by the examples illustrated in FIG. 6 through FIG. 33, these serving mainly for illustrative purposes rather than to restrict in any way the scope of application of the invention.

What is claimed is:

1. A charging cut-off circuit for a rechargeable battery charger, comprising:
    a thermo-sensitive circuit breaker connected in series between the rechargeable battery and a power supply, wherein when a temperature of said battery exceeds a predetermined temperature, said thermo-sensitive circuit breaker opens to cut-off supply of charging current from said power source to said rechargeable battery, and wherein said circuit breaker resets to enable supply of charging current from said power source to said rechargeable battery as said battery cools following saturation;
    a charge-maintaining heat-generating resistance means connected in parallel with and thermally coupled to said thermo-sensitive circuit breaker for conducting a topping current when said thermo-sensitive circuit breaker opens, and for holding said thermo-sensitive circuit breaker open by heat from said resistance means as the battery cools following saturation, thereby extending a time for the circuit breaker to reset.

2. A charging cut-off circuit as claimed in claim 1, wherein said circuit breaker, said resistance means, and said rechargeable battery are housed together in a shell arranged to be plugged directly into a housing of the power supply.

3. A charging cut-off circuit as claimed in claim 1, wherein said circuit breaker, said resistance means, and said rechargeable battery are housed together in a shell arranged to be plugged into a housing of the power supply by means of conductive contacts.

4. A charging cut-off circuit as claimed in claim 1, wherein said circuit breaker and said resistance means are housed together in a housing of the power supply, and said rechargeable battery is arranged to be plugged directly into a housing of the power supply.

5. A charging cut-off circuit as claimed in claim 1, wherein said circuit breaker and said resistance means are housed together in a housing of the power supply, and said rechargeable battery is arranged to be plugged into a housing of the power supply by means of conductive contacts.

6. A charging cut-off circuit as claimed in claim 1, wherein said circuit breaker and said rechargeable battery are housed together in a shell arranged to be plugged directly into a housing of the power supply, and said resistance means is housed in said housing of the power supply.

7. A charging cut-off circuit as claimed in claim 1, wherein said circuit breaker and said rechargeable battery are housed together in a shell arranged to be plugged directly into a housing of the power supply, and said resistance means is housed in said housing of the power supply by means of conductive contacts.

8. A charging cut-off circuit as claimed in claim 1, wherein said resistance means and said rechargeable battery are housed together in a shell arranged to be plugged directly into a housing of the power supply, and said circuit breaker is housed in said housing of the power supply.

9. A charging cut-off circuit as claimed in claim 1, wherein said resistance means and said rechargeable battery are housed together in a shell arranged to be plugged into a housing of the power supply, and said circuit breaker is housed in said housing of the power supply by means of conductive contacts.

10. A charging cut-off circuit as claimed in claim 1, further comprising a second thermo-sensitive circuit breaker arranged to cut-off power to at least one second rechargeable battery upon heating of said at least one second rechargeable battery.

11. A charging cut-off circuit as claimed in claim 1, wherein said circuit breaker and resistance means are housed in a separate enclosure to facilitate thermal coupling of the circuit breaker and resistance means.

12. A charging cut-off circuit as claimed in claim 1, wherein said circuit breaker and resistance means are housed together in a sealed enclosure.

13. A charging cut-off circuit as claimed in claim 1, further comprising an auxiliary heat generating resistor connected to the power supply to generate heat during charging and hereby compensate for low ambient temperatures that would otherwise prevent cut-off upon saturation of the rechargeable battery.

14. A charging cut-off circuit as claimed in claim 13, wherein said auxiliary resistor is connected in parallel between said power supply and said series combination of the rechargeable battery and the parallel-connected circuit breaker/resistance combination.

15. A charging cut-off circuit as claimed in claim 14, further comprising a diode connected between the power supply and the auxiliary resistor for preventing the rechargeable battery from discharging through the auxiliary resistor.

16. A charging cut-off circuit as claimed in claim 13, wherein said power supply is a rectifier, and said auxiliary resistor is connected in series between an input terminal of said rectifier and said parallel-connected circuit breaker/resistance combination.

17. A charging cut-off circuit as claimed in claim 16, further comprising a diode connected between the power supply and the auxiliary resistor for preventing the rechargeable battery from discharging through the auxiliary resistor.

18. A charging cut-off circuit as claimed in claim 13, further comprising a power indicator connected in parallel resistor for indicating whether power is being supplied to said rechargeable battery.

19. A charging cut-off circuit as claimed in claim 1, further comprising a display connected to said resistance for indicating when a topping current is present in said resistance.

20. A charging cut-off circuit as claimed in claim 19, wherein said display is connected in series between the power supply and the resistance.

21. A charging cut-off circuit as claimed in claim 20, further comprising a current splitting resistor connected in parallel with said display between the power supply and the resistance.

22. A charging cut-off circuit as claimed in claim 1, further comprising contact protection means connected in parallel with said resistance for inhibiting electromagnetic interference and protecting conductive contacts from transients arising when the thermo-sensitive circuit breaker opens.

23. A charging cut-off circuit as claimed in claim 1, further comprising first and second contact assemblies for connecting said rechargeable battery, a second said thermo-sensitive circuit breaker in series with said power supply, and a third contact assembly connected between one end of said resistance and said rechargeable battery.

24. A charging cut-off circuit as claimed in claim 23, further comprising a diode connected between said second and third plug/socket assemblies in a direct of current flow between said second and third contact assemblies, wherein charging current is allowed to pass when a rechargeable battery not equipped with said second said thermo-sensitive circuit breaker is plugged into said first and third contact assemblies.

25. A charging cut-off circuit as claimed in claim 24, further comprising an auxiliary resistor connected at a first end to the third contact assembly and at a second end to the rechargeable battery.

26. A charging cut-off circuit as claimed in claim 23, further comprising means for shorting a power supply side of the resistance to a load side of the first thermo-sensitive circuit breaker to enable charge to be limited when the rechargeable battery is equipped with said second thermo-sensitive circuit breaker.

* * * * *